(12) United States Patent
Nozawa

(10) Patent No.: US 11,476,508 B2
(45) Date of Patent: Oct. 18, 2022

(54) POWER SUPPLY SYSTEM AND CONTROL METHOD THEREOF

(71) Applicant: TOYOTA JIDOSHA KABUSHIKI KAISHA, Toyota (JP)

(72) Inventor: Takashi Nozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 16/811,082

(22) Filed: Mar. 6, 2020

(65) Prior Publication Data
US 2020/0328478 A1 Oct. 15, 2020

(30) Foreign Application Priority Data

Apr. 9, 2019 (JP) .............................. JP2019-074001

(51) Int. Cl.
*H01M 10/42* (2006.01)
*B60L 50/64* (2019.01)
*H01M 10/44* (2006.01)

(52) U.S. Cl.
CPC ......... *H01M 10/4264* (2013.01); *B60L 50/64* (2019.02); *H01M 10/446* (2013.01)

(58) Field of Classification Search
CPC ........... H01M 10/4264; H01M 10/446; H01M 2010/4278; H01M 2220/20; H01M 16/00; B60L 50/64; B60L 3/0046; B60L 50/66; B60L 1/00; B60L 3/00; B60L 2210/10; Y02E 60/10; Y02T 10/70
See application file for complete search history.

(56) References Cited

U.S. PATENT DOCUMENTS 8,247,920 B2 * 8/2012 Hirasawa .............. B60W 20/10
307/134
2013/0063091 A1 3/2013 Nishi et al.

FOREIGN PATENT DOCUMENTS

| JP | 2004-14242 A | 1/2004 |
| JP | 2007-59138 A | 3/2007 |
| JP | 2007-318849 A | 12/2007 |
| JP | 2009-268214 A | 11/2009 |
| WO | 2012/168963 A1 | 12/2012 |

* cited by examiner

*Primary Examiner* — Jung Kim
(74) *Attorney, Agent, or Firm* — Sughrue Mion, PLLC

(57) ABSTRACT

A power supply system includes a power storage device, a positive electrode-side relay, a negative electrode-side relay, a power control unit that includes a capacitor configured to be pre-charged in response to a system start request and that is connected with the power storage device via the positive electrode-side relay and the negative electrode-side relay, and a control device programmed to close the positive electrode-side relay and the negative electrode-side relay at different timings always or under a predetermined condition in response to the system start request and programmed to change a sequence of closing the positive electrode-side relay and the negative electrode-side relay in accordance with a predetermined restriction. This configuration effectively extends the lives of the positive electrode-side relay and the negative electrode-side relay.

10 Claims, 12 Drawing Sheets

| START MODE | ORDINARY START (F1=F2=0) | FAILURE TO OBTAIN VB (F1=1,F2=0) | FAILURE TO SEND Vtag (F2=1) |
|---|---|---|---|
| ΔD | d0 | d1 | d2 |

POWER SUPPLY SYSTEM AND CONTROL METHOD THEREOF

CROSS-REFERENCE TO RELATED APPLICATION

This application claims priority to Japanese Patent Application No. 2019-074001 filed on Apr. 9, 2019, the contents of which is incorporated herein by reference.

TECHNICAL FIELD

The present disclosure relates to a power supply system including a power storage device, a positive electrode-side relay, a negative electrode-side relay and a power control unit that includes a capacitor and that is connected with the power storage device via the positive electrode-side relay and the negative electrode-side relay, as well as to a control method thereof.

BACKGROUND

A known configuration of an electric system provided on an electric vehicle includes a first power storage device; a smoothing capacitor configured to smooth a DC voltage of the first power storage device; an inverter configured to convert a DC voltage of the smoothing capacitor into an AC voltage and supply the AC voltage to a driving motor; first and second relays provided between the first power storage device and the smoothing capacitor; a second power storage device configured to have a lower voltage than the voltage of the first power storage device; a bidirectional DC/DC converter provided between the first and second relays and the smoothing capacitor and configured to step down the voltage of the first power storage device or the smoothing capacitor and supply the stepped-down voltage to the second power storage device and to step up the voltage of the second power storage device and supply the stepped-up voltage to the smoothing capacitor; and a control device configured to control the entire system (as described in, for example, JP 2007-318849A). When receiving a start instruction by an ON operation of an ignition switch, the control device of this electric system controls the bidirectional DC/DC converter to perform the step-up operation. When the voltage of the smoothing capacitor reaches a precharge completion reference value, the control device stops the step-up operation of the bidirectional DC-DC converter and closes the first relay and the second relay at different timings.

SUMMARY

The electric system described above controls the bidirectional DC/DC converter to perform the step-up operation in response to the start instruction and pre-charge the smoothing capacitor. This suppresses high inrush current from flowing from the first power storage device toward the inverter side when the first and the second relays are closed. At some voltage level of the capacitor after the precharge, however, an arc is likely to occur in one of the first and the second relays even when the first and the second relays are closed at different timings. This is likely to shorten the lives of the first and the second relays.

In a power supply system including a power storage device, a positive electrode-side relay, a negative electrode-side relay, and a power control unit that includes a capacitor and that is connected with the power storage device via the positive electrode-side relay and the negative electrode-side relay, a main object of the present disclosure is to effectively extend the lives of the positive electrode-side relay and the negative electrode-side relay.

A power supply system of the present disclosure includes a power storage device, a positive electrode-side relay, a negative electrode-side relay, and a power control unit that includes a capacitor configured to be pre-charged in response to a system start request and that is connected with the power storage device via the positive electrode-side relay and the negative electrode-side relay. The power supply system further includes a control device programmed to close the positive electrode-side relay and the negative electrode-side relay at different timings always or under a predetermined condition in response to the system start request. The control device is programmed to change a sequence of closing the positive electrode-side relay and the negative electrode-side relay in accordance with a predetermined restriction.

According to another aspect of the present disclosure, there is provided a control method of a power supply system including a power storage device, a positive electrode-side relay, a negative electrode-side relay, and a power control unit that includes a capacitor configured to be pre-charged in response to a system start request and that is connected with the power storage device via the positive electrode-side relay and the negative electrode-side relay. The control method of the power supply system comprises closing the positive electrode-side relay and the negative electrode-side relay at different timings always or under a predetermined condition, in response to the system start request, and changing a sequence of closing the positive electrode-side relay and the negative electrode-side relay in accordance with a predetermined restriction.

DESCRIPTION OF EMBODIMENTS

Some aspects of the present disclosure are described below with reference to drawings.

Figure 1:
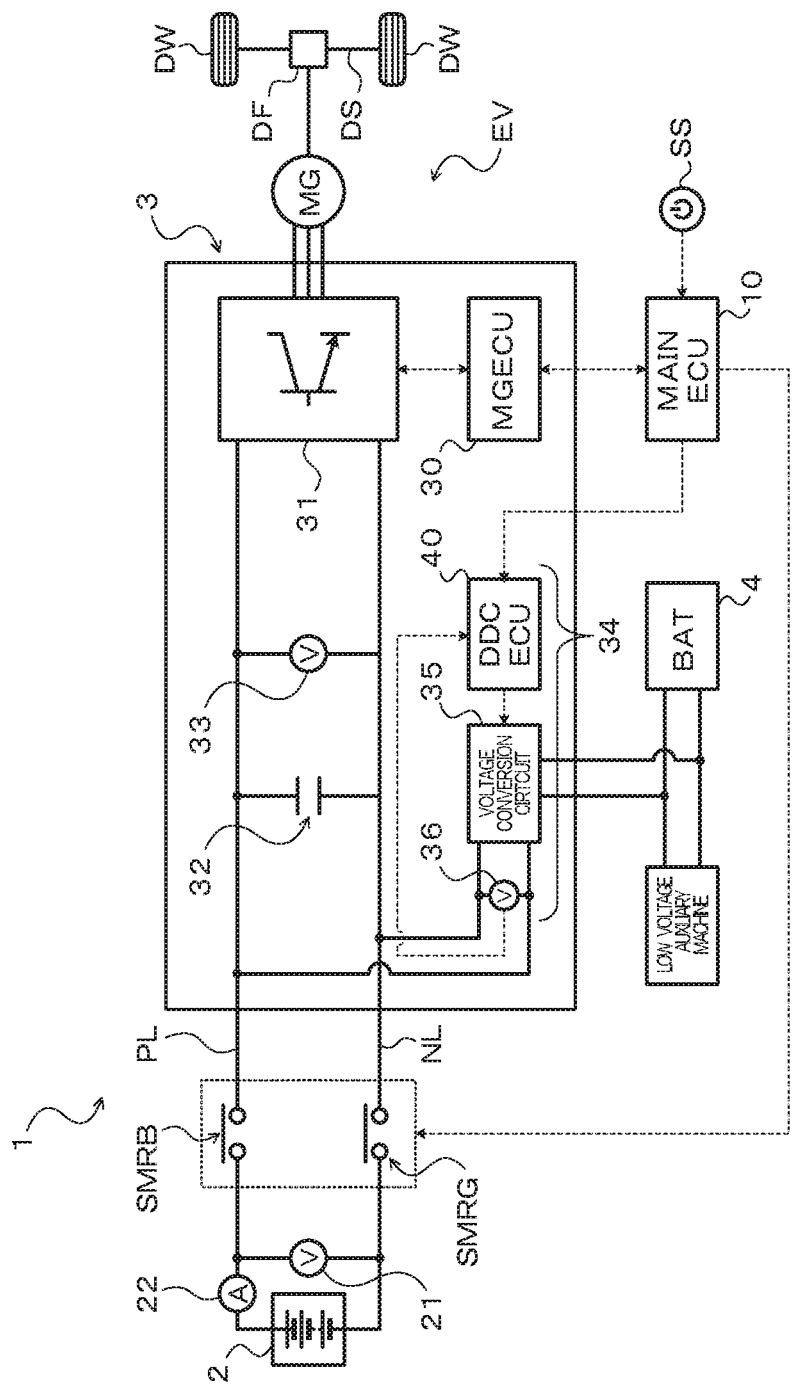
FIG. 1 is a schematic configuration diagram illustrating a vehicle provided with a power supply system according to an embodiment of the present disclosure.

FIG. 1 is a schematic configuration diagram illustrating an electric vehicle EV configured as a vehicle including a power supply system 1 according to an embodiment of the present disclosure. The electric vehicle EV illustrated in FIG. 1 includes, for example, a motor generator MG configured to transmit electric power to and from the power supply system 1 and an electronic control unit (hereinafter referred to as "main ECU") 10 configured to control the entire electric vehicle EV, in addition to the power supply system 1. The power supply system 1 includes, for example, a high voltage battery (first power storage device) 2, a positive electrode-side system main relay (hereinafter referred to as "positive electrode-side relay") SMRB and a negative electrode-side system main relay (hereinafter referred to as "negative electrode-side relay") SMRG that are respectively closed when exciting current is supplied to respective coils thereof (not shown), a power control unit (hereinafter referred to as "PCU") 3 connected with the high voltage battery 2 via the positive electrode-side relay SMRB and the negative electrode-side relay SMRG and configured to drive the motor generator MG, and a low voltage battery (second power storage device) 4 configured to have a lower voltage than the voltage of the high voltage battery 2.

The motor generator MG is a synchronous generator motor (three-phase AC motor). The motor generator MG has a rotor that is linked with left and right drive wheels DW via a differential gear DF and a driveshaft DS. The motor generator MG is driven with the electric power from the power supply system 1 (more specifically, from the high voltage battery 2) to output a driving torque to the drive wheels DW, while outputting a regenerative braking torque in the course of braking the electric vehicle EV. The electric power generated by the motor generator MG along with the output of the regenerative braking torque is received by the high voltage battery 2.

The main ECU 10 is configured by a microcomputer including, for example, a CPU, a ROM and a RAM (not shown). The main ECU 10 is connected with various sensors including a start switch SS, an accelerator pedal position sensor, a shift position sensor and a vehicle speed sensor. In the process of driving the electric vehicle EV, the main ECU 10 sets a required torque that is required for driving, based on an accelerator position and a vehicle speed and also sets a torque command value or the like for the motor generator MG, based on the set required torque or the like.

The main ECU 10 also serves to open and close the positive electrode-side relay SMRB and the negative electrode-side relay SMRG. When the driver turns on the start switch SS to make a system start request of the electric vehicle EV, the main ECU 10 supplies the exciting current to the respective coils (not shown) of the positive electrode-side relay SMRB and the negative electrode-side relay SMRG to close (turn on) both the positive electrode-side relay SMRB and the negative electrode-side relay SMRG and thereby electrically connect the high voltage battery 2 with the PCU 3. When the driver turns off the start switch SS to make a system stop request of the electric vehicle EV, the main ECU 10 cuts off the supply of the exciting current to the positive electrode-side relay SMRB and the negative electrode-side relay SMRG to open (turn off) both the positive electrode-side relay SMRB and the negative electrode-side relay SMRG and thereby electrically disconnect the high voltage battery 2 from the PCU 3.

The high voltage battery 2 constituting part of the power supply system 1 is a lithium ion rechargeable battery or a nickel metal hydride battery having a rated output voltage of, for example, 200 V to 400 V and is configured to be rechargeable with electric power from an external power source (not shown). The high voltage battery 2 has a positive electrode terminal that is connected with a positive electrode-side power line PL via the positive electrode-side relay SMRB and has a negative electrode terminal that is connected with a negative electrode-side power line NL via the negative electrode-side relay SMRG. The high voltage battery 2 is also provided with a voltage sensor 21 configured to detect a voltage across terminals VB of the high voltage battery 2 and a current sensor 22 configured to detect electric current (charge discharge current) IB flowing in the high voltage battery 2. The voltage across terminals VB of the high voltage battery 2 detected by the voltage sensor 21 and the electric current IB detected by the current sensor 22 are sent to the main ECU 10 directly via a signal line (not shown) or by a power supply management electronic control unit (not shown) configured to manage the high voltage battery 2.

The PCU 3 constituting part of the power supply system 1 includes an inverter 31 configured to drive the motor generator MG, a capacitor (smoothing capacitor) 32, a voltage sensor 33, a bidirectional DC/DC converter (voltage converter device) 34, and a motor electronic control unit (hereinafter referred to as MGECU) 30 configured to control the inverter 31.

The inverter 31 is comprised of six transistors (not shown) (for example, insulated gate bipolar transistors (IGBT)) and six diodes (not shown) that are connected in a reverse direction to and in parallel to the respective transistors. The six transistors are arranged in pairs, such that two transistors in each pair respectively serve as a source and a sink relative to the positive electrode-side power line PL and the negative electrode-side power line NL. The respective phases of three-phase coils (U phase, V phase and W phase coils) of the motor generator MG are connected with connection points of the respective pairs of the transistors.

The capacitor 32 has a positive electrode terminal that is electrically connected with the positive electrode-side power line PL between the positive electrode-side relay SMRB and the inverter 31 and a negative electrode terminal that is electrically connected with the negative electrode-side power line NL between the negative electrode-side relay SMRG and the inverter 31. This configuration causes the voltage on a high voltage battery 2-side of the inverter 31 to be smoothed by the capacitor 32. The voltage sensor 33 serves to detect a voltage across terminals VH of the capacitor 32. The voltage across terminals VH of the capacitor 32 detected by the voltage sensor 33 is sent to the MGECU 30 and is also sent to the main ECU 10 directly via a signal line (not shown) or by the MGECU 30.

The bidirectional DC/DC converter (DDC) 34 is connected with the positive electrode-side power line PL between the positive electrode-side relay SMRB and the PCU 3 (more specifically, the capacitor 32) and is also connected with the negative electrode-side power line NL between the negative electrode-side relay SMRG and the PCU 3 (more specifically, the capacitor 32). The bidirectional DC/DC converter 34 is further connected with the low voltage battery 4 and a plurality of auxiliary machines (low voltage auxiliary machine) via low voltage power lines. The bidirectional DC/DC converter 34 is configured to step down the voltage of electric power on the positive electrode-side power line PL-side, i.e., on the high voltage battery 2- and the PCU 3- (more specifically, the inverter 31-) side and supply the electric power of the stepped-down voltage to the low voltage power lines-side, i.e., to the respective auxiliary machines and the low voltage battery 4 and to step up the voltage of electric power from the low voltage battery 4 and supply the electric power of the stepped-up voltage to the positive electrode-side power line PL-side, i.e., to the high voltage battery 2- and the PCU 3-side.

According to the embodiment, the bidirectional DC/DC converter 34 includes, for example, a voltage conversion circuit 35, a voltage sensor 36 configured to detect an output voltage of the voltage conversion circuit 35 to the high voltage battery 2- and the PCU 3-side, a voltage sensor (not shown) configured to detect an output voltage of the voltage conversion circuit 35 to the low voltage battery 4-side, and an electronic control unit (hereinafter referred to as "DDCECU) 40 configured to perform feedback control of the voltage conversion circuit 35, such as to cause a detected value of the voltage sensor 36 or the like to become equal to a target voltage Vtag. According to the embodiment, the target voltage Vtag of the bidirectional DC/DC converter 34 (or more specifically, the voltage conversion circuit 35) is set by the main ECU 10 and is sent from the main ECU 10 to the DDCECU 40 via a communication line such as CAN.

The MGECU 30 is configured by a microcomputer including, for example, a CPU, a ROM and a RAM (not shown) and is connected with the main ECU 10 and the like via communication lines such as CAN. The MGECU 30 obtains the inputs of, for example, command signals from the main ECU 10, a detected value of a resolver (not shown) configured to detect a rotational position of the rotor of the motor generator MG, the voltage across terminals VH from the voltage sensor 33, and phase currents that are detected by current sensors (not shown) and that are to be applied to the motor generator MG. The MGECU 30 generates gate signals (switching control signals) that are to be given to the inverter 31, based on these inputs, so as to perform switching control of the plurality of transistors included in the inverter 31.

The low voltage battery 4 constituting part of the power supply system 1 is, for example, a lead acid battery having a rated output voltage of, for example, 12 V and is connected with the plurality of auxiliary machines (low voltage auxiliary machines) via the low voltage power lines. High voltage auxiliary machines (not shown), for example, a compressor of an air conditioner (inverter compressor) and a converter to AC 100V, are connected with the positive electrode-side power line PL between the positive electrode-side relay SMRB and the PCU 3 and with the negative electrode-side power line NL between the negative electrode-side relay SMRG and the PCU 3.

Figure 2:
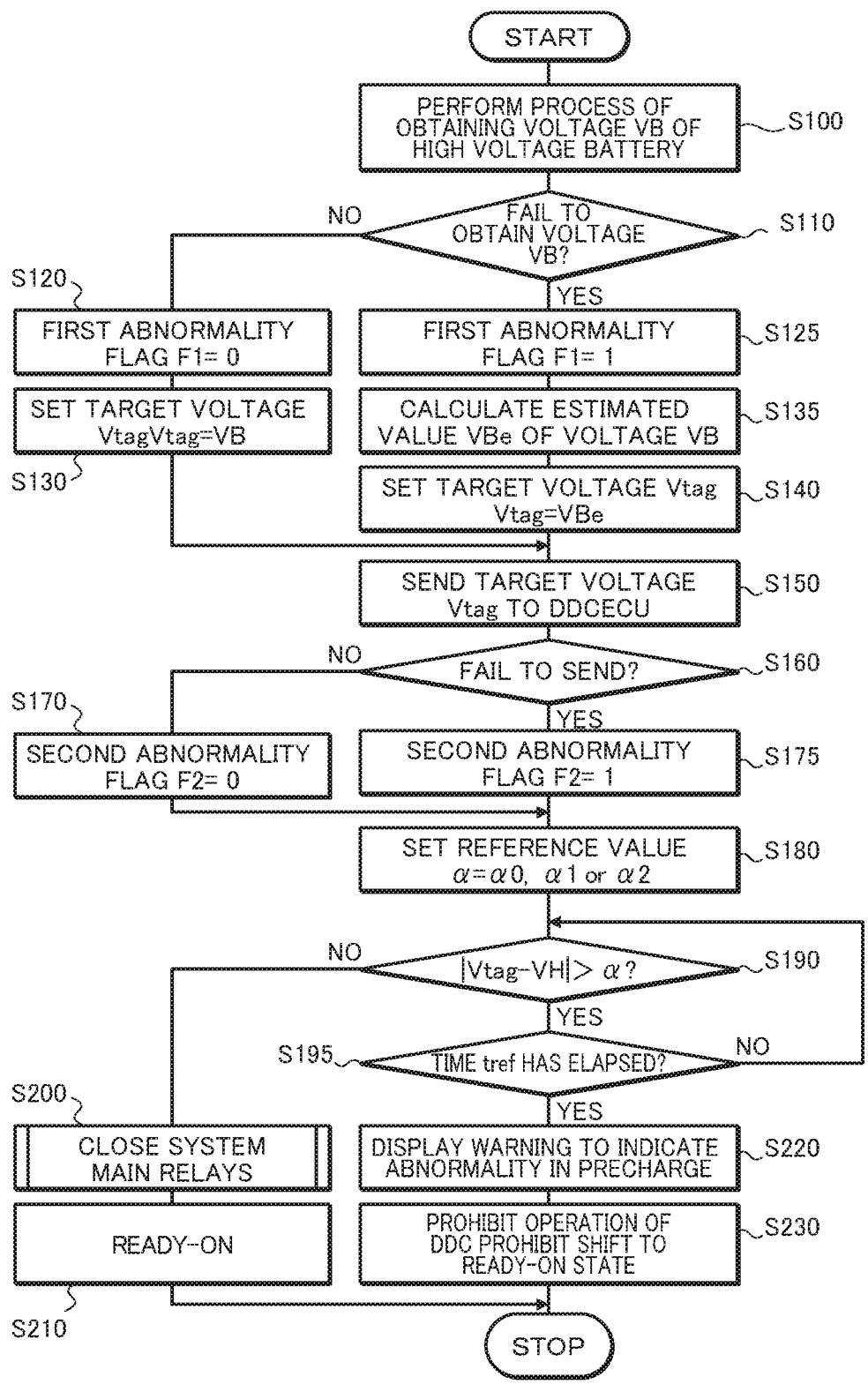
FIG. 2 is a flowchart showing one example of a routine performed by a control device of the power supply system of the embodiment, in response to a system start request.

The following describes a control procedure of the power supply system 1 when the driver turns on the start switch SS to start the system of the electric vehicle EV with reference to FIG. 2. FIG. 2 is a flowchart showing one example of a routine performed by the main ECU 10 in response to the driver's ON operation of the start switch SS to make a system start request of the electric vehicle EV.

When the driver turns on the start switch SS, the main ECU 10 (CPU) performs a process of obtaining the voltage across terminals VB of the high voltage battery 2 detected by the voltage sensor 21 (step S100) and determines whether the voltage across terminals VB was normally obtained (step S110) as shown in FIG. 2. When it is determined at step S110 that the voltage across terminal VB was normally obtained (i.e., the main ECU 10 did not fail to normally obtain the voltage across terminals VB) (step S110: NO), the main ECU 10 sets a first abnormality flag F1 to a value 0 (step S120) and sets the obtained voltage across terminals VB to the target voltage Vtag in the course of precharge of the capacitor 32 of the PCU 3 (step S130). When it is determined at step S110 that the voltage across terminals VB was not normally obtained (i.e., the main ECU 10 failed to normally obtain the voltage across terminals VB) (step S110: YES) due to, for example, a defect of the voltage sensor 21, disconnection of the signal line or communication failure with the power supply management electronic control unit (not shown), on the other hand, the main ECU 10 sets the first abnormality flag F1 to a value 1 (step S125), calculates an estimated value VBe of the voltage across terminals VB of the high voltage battery 2 (step S135), and sets the calculated estimated value VBe to the target voltage Vtag (step S140).

More specifically, at step S135, the main ECU 10 obtains an elapsed time $\Delta t$ since a last obtaining timing when the voltage across terminals VB was normally obtained last time. The elapsed time $\Delta t$ is separately counted by a counter of the main ECU 10 that is reset to start counting at a timing when the voltage across terminals VB is normally obtained. The main ECU 10 subsequently multiplies a discharge current Iloss that is determined in advance as a sum of the self discharge current of the high voltage battery 2 and the dark current by the elapsed time $\Delta t$, so as to calculate a discharge amount [A·h] of the high voltage battery 2 after the voltage across terminals VB was normally obtained last time (during a system stop). The main ECU 10 also divides the discharge amount (=Iloss×$\Delta t$) by a full charge capacity Cfull [A·h] of the high voltage battery 2, so as to calculate a reduction $\Delta$SOC in the SOC (state of charge) of the high voltage battery 2 after the voltage across terminals VB was normally obtained last time. The main ECU 10 further derives a reduction $\Delta$Vloss in the voltage across terminals VB corresponding to the calculated reduction $\Delta$SOC in the SOC from an OCV map (not shown) that specifies a relationship between the SOC and the voltage across terminals (open voltage) VB of the high voltage battery 2. The main ECU 10 then subtracts the reduction $\Delta$Vloss from a last voltage across terminals VBlast that was normally obtained last time and that is stored in a non-volatile memory or the like (not shown), so as to calculate the estimated value VBe of the voltage across terminals VB.

After setting the target voltage Vtag either at step S130 or at step S140, the main ECU 10 sends the target voltage Vtag to the DDCECU 40 of the bidirectional DC/DC converter 34 (step S150) and determines whether the target voltage Vtag was normally sent to the DDCECU 40 (step S160). When it is determined at step S160 that the target voltage Vtag was normally sent to the DDCECU 40 (i.e., the main ECU 10 did not fail to normally send the target value Vtag to the DDCECU 40) (step S160: NO), the main ECU 10 sets a second abnormality flag F2 to a value 0 (step S170). When receiving the target voltage Vtag from the main ECU 10, the DDCECU 40 starts feedback control of the voltage conversion circuit 35 such that the detected value of the voltage sensor 36 becomes equal to the target voltage Vtag in the case where the positive electrode-side relay SMRB and the negative electrode-side relay SMRG are opened. When the detected value of the voltage sensor 36 becomes equal to the target voltage Vtag, the DDCECU 40 performs feedback control of the voltage conversion circuit 35, such as to cause the detected value of the voltage sensor 36 to be kept equal to the target voltage Vtag.

When it is determined at step S160 that the target voltage Vtag was not normally sent to the DDCECU 40 (i.e., the main ECU 10 failed to normally send the target voltage Vtag to the DDCECU 40) (step S160: YES), on the other hand, the main ECU 10 sets the second abnormality flag F2 to a value 1 (step S175). When failing to receive the target voltage Vtag from the main ECU 10 after elapse of a predetermined time period since an ON operation of the start switch SS, the DDCECU 40 sets a relatively small value that is determined in advance to suppress the generation of inrush current, to the target voltage Vtag and performs feedback control of the voltage conversion circuit 35, such as to cause the detected value of the voltage sensor 36 to become equal to the target voltage Vtag.

After the processing of either step S170 or step S175, the main ECU 10 sets a reference value α that is used to determine whether precharge of the capacitor 32 is completed, based on the set values of the first and the second abnormality flags F1 and F2 (step S180). When both the first and the second abnormality flag F1 and F2 are equal to the value 0 at step S180, the main ECU 10 sets a predetermined relatively small positive value α0 (for example, about 30 V) to the reference value α. When the first abnormality flag F1 is equal to the value 1 and the second abnormality flag F2 is equal to the value 0 at step S180, the main ECU 10 sets a predetermined positive value α1 that is larger than the value α0, to the reference value α. When the second abnormality flag F2 is equal to the value 1, the main ECU 10 sets a positive value α2 that is larger than the value α0 and the value α1, to the reference value α, irrespective of the set value of the first abnormality flag F1. Accordingly, the accuracy of precharge at the time of a system start decreases in a sequence of the case of an ordinary start (F1=F2=0), the case of a failure to obtain the voltage across terminals VB of the high voltage battery (F1=1 and F2=0) and the case of a failure to send the target voltage Vtag (F2=1).

The main ECU 10 subsequently obtains the voltage across terminals VH of the capacitor 32 detected by the voltage sensor 33 and determines whether an absolute value |Vtag−VH| of a difference between the target voltage Vtag set either at step S130 or at step S140 and the obtained voltage across terminals VH is larger than the reference value α set at step S180 (i.e., whether the absolute value |Vtag−VH| is out of a range from −α to +α (predetermined range)) (step S190). When it is determined at step S190 that the absolute value |Vtag−VH| is larger than the reference value α (step S190: YES), the main ECU 10 subsequently determines whether a predetermined time tref has elapsed since transmission of the target voltage Vtag to the DDCECU 40 at step S150 (step S195). The time tref used as a reference value at step S195 is specified as a time period regarded that the voltage across terminals VH of the capacitor 32 reaches the target voltage Vtag by precharge using the bidirectional DC/DC converter 34 after transmission of the target voltage Vtag to the DDCECU 40.

When it is determined at step S195 that the time tref has not yet elapsed since transmission of the target voltage Vtag to the DDCECU 40 (step S195: NO), the main ECU 10 performs the determination process of step S190 again. When it is determined at step S190 that the absolute value |Vtag−VH| becomes equal to or smaller than the reference value α (i.e., within the range from −α to +a) (step S190: NO), on the other hand, the main ECU 10 closes the positive electrode-side relay SMRB and the negative electrode-side relay SMRG always at different timings (step S200). In this state, the voltage across terminals VH of the capacitor 32 has a value close to the target voltage Vtag, i.e., the voltage across terminals VB of the high voltage battery 2. This suppresses a high inrush current from flowing in the positive electrode-side relay SMRB, the negative electrode-side relay SMRG and the PCU 3 when both the relays SMRB and SMRG are closed. After the processing of step S200, the main ECU 10 shifts the state of the electric vehicle EV to a Ready state (READY-ON state) that enables the electric vehicle EV to be driven (step S210) and then terminates the routine of FIG. 2.

When it is determined at step S190 that the absolute value |Vtag−VH| is larger than the reference value α and it is determined at step S195 that the time tref has elapsed since transmission of the target voltage Vtag to the DDCECU 40 (both steps S190 and S195: YES), this means that the capacitor 32 is overcharged beyond the target voltage Vtag due to a failure of the voltage conversion circuit 35, the voltage sensor 36, the DDCECU 40 or the like of the bidirectional DC/DC converter 34 or that the bidirectional DC/DC converter 34 fails to step up the voltage of the electric power from the low voltage battery 4. Accordingly, in the case of an affirmative answer at step S195, the main ECU 10 turns on a warning light provided on an instrument panel (not shown) or the like (step S220), in order to indicate an abnormality in precharge using the bidirectional DC/DC converter 34. The main ECU 10 also prohibits the operation of the bidirectional DC/DC converter 34 and the shift of the state of the electric vehicle EV to the READY-ON state (step S230) and then terminates the routine of FIG. 2.

When the routine of FIG. 2 is terminated after the processing of steps S220 and S230, the main ECU 10 performs a discharge process of the capacitor 32 by switching control of the inverter 31 as needed basis. When the first abnormality flag F1 is set to the value 1 at step S125 or the second abnormality flag F2 is set to the value 1 at step S175, the main ECU 10 turns on a warning light provided on the instrument panel or the like (not shown) immediately after the shift to the READY-ON state or after determination of an abnormality.

Figures 3, 4:
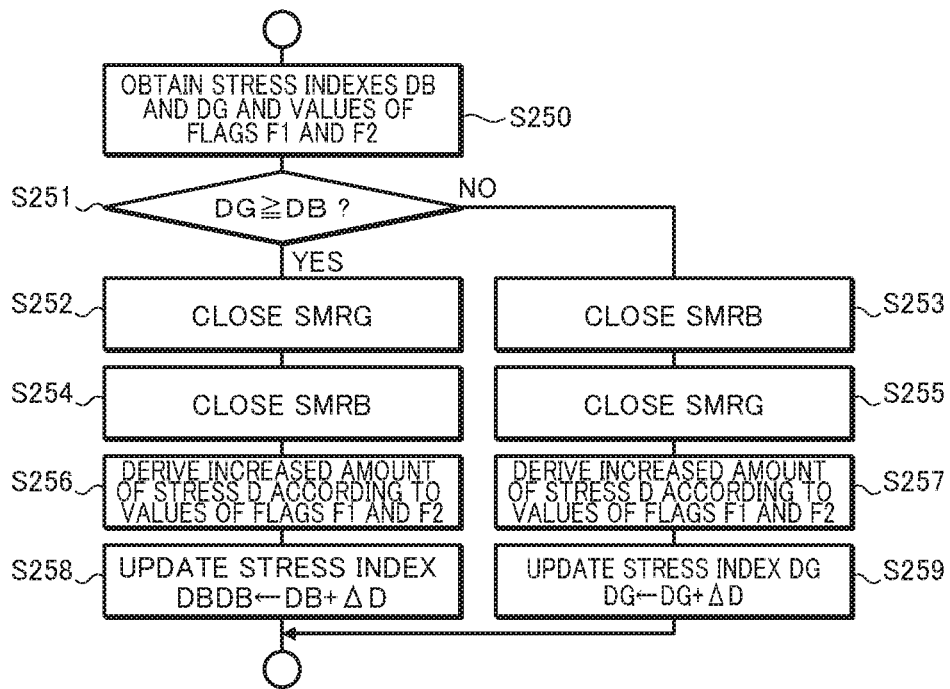
FIG. 3 is a flowchart showing one example of a procedure of closing a positive electrode-side relay and a negative electrode-side relay at step S200 shown in FIG. 2.
FIG. 4 is a diagram illustrating one example of a stress increase map.

FIG. 3 is a flowchart showing one example of a procedure of closing the positive electrode-side relay SMRB and the negative electrode-side relay SMRG at step S200 of FIG. 2. When it is determined at step S190 that the absolute value |Vtag−VH| becomes equal to or smaller than the reference value α (step S190: NO), the main ECU 10 obtains a stress index DB of the positive electrode-side relay SMRB, a stress index DG of the negative electrode-side relay SRMG, and the set values of the first and the second abnormality flags F1 and F2 (step S250). The main ECU 10 subsequently determines whether the stress index DG obtained at step S250 is equal to or larger than the stress index DB obtained at step S250 (step S251).

The stress index DB is a real number indicating the degree of stress (mainly, electrical stress) accumulated into the positive electrode-side relay SMRB accompanied with closing and opening. The stress index DG is a real number indicating the degree of stress (mainly, electrical stress) accumulated into the negative electrode-side relay SMRG accompanied with closing and opening. The stress index DG is calculated (integrated) by adding an increased amount of stress ΔD according to the state (for example, any abnormality or no abnormality) at the time of a system start to a previous value when the positive electrode-side relay SMRB is closed after the negative electrode-side relay SMRG at the time of a system start and when the positive electrode-side relay SMRB is opened prior to the negative electrode-side relay SMRG at the time of a system stop and is stored into a non-volatile memory or the like. Similarly, the stress index DB is calculated (integrated) by adding an increased amount of stress ΔD according to the state (for example, any abnormality or no abnormality) at the time of a system start to a previous value when the negative electrode-side relay SMRG is closed after the positive electrode-side relay SMRB at the time of a system start and when the negative electrode-side relay SMRG is opened prior to the positive electrode-side relay SMRB at the time of a system stop and is stored into a non-volatile memory or the like. Accordingly, the stress indexes DB and DG increase with elapse of the duration of use of the electric vehicle EV. The larger value of the stress index DB or DG indicates the greater stress accumulated.

When it is determined at step S251 that the stress index DG is equal to or larger than the stress index DB (step S251: YES), the main ECU 10 supplies the exciting current to the negative electrode-side relay SMRG to close (only) the negative electrode-side relay SMRG (step S252). The main ECU 10 then supplies the exciting current to the positive electrode-side relay SMRB, so as to close the positive electrode-side relay SMRB after the negative electrode-side relay SMRG is fully closed (step S254). This applies the stress accompanied with closing to the positive electrode-side relay SMRB that has the less accumulated stress compared with the negative electrode-side relay SMRG. This accordingly suppresses the stresses from being unevenly accumulated in the negative electrode-side relay SMRG.

The main ECU 10 subsequently derives the increased amount of stress ΔD of the positive electrode-side relay SMRB that was closed after the negative electrode-side relay SMRG, based on the set values of the first and the second abnormality flags F1 and F2 obtained at step S250 (step S256). According to the embodiment, a stress increase map that specifies a relationship between the set values of the first and the second abnormality flags F1 and F2 and the increased amount of stress ΔD as shown in FIG. 4 is created in advance by analyses or the like and is stored in, for example, the ROM of the main ECU 10. More specifically, at step S256, the main ECU 10 derives the increased amount of stress ΔD corresponding to the set values of the first and the second abnormality flags F1 and F2 from the stress increase map.

According to the embodiment, the stress increase map is prepared such that a relatively small value d0 (for example, d0=1) is given as the increased amount of stress ΔD in the case of an ordinary start when both the first and the second abnormality flags F1 and F2 are equal to the value 0. The stress increase map is also prepared such that a relatively large value d1 (for example, d1=10) is given as the increased amount of stress ΔD in the case of a failure to obtain the voltage across terminals VB of the high voltage battery 2 (F1=1 and F2=0). The stress increase map is further prepared such that a larger value d2 that is (slightly) larger than the value d0 and the value d1 (for example, d2=15) is given as the increased amount of stress ΔD in the case of a failure to send the target voltage Vtag (F2=1). In other words, the lower accuracy of precharge at the time of a system start causes the larger value to be set to the increased amount of stress ΔD.

After deriving the increased amount of stress ΔD at step S256, the main ECU 10 adds the derived increased amount of stress ΔD to a previous value of the stress index DB of the positive electrode-side relay SMRB that was closed after the negative electrode-side relay SMRG to update (calculate) the stress index DB (step S258). The main ECU 10 subsequently shifts the state of the electric vehicle EV to the READY-ON state that enables the electric vehicle EV to be driven (step S210) and then terminates the routine of FIG. 2.

When it is determined at step S251 that the stress index DG is smaller than the stress index DB (step S251: NO), on the other hand, the main ECU 10 supplies the exciting current to the positive electrode-side relay SMRB to close (only) the positive electrode-side relay SMRB (step S253). The main ECU 10 then supplies the exciting current to the negative electrode-side relay SMRG, so as to close the negative electrode-side relay SMRG after the positive electrode-side relay SMRB is fully closed (step S255). This applies the stress accompanied with closing to the negative electrode-side relay SMRG that has the less accumulated stress compared with the positive electrode-side relay SMRB. This accordingly suppresses the stresses from being unevenly accumulated in the positive electrode-side relay SMRB.

The main ECU 10 subsequently derives the increased amount of stress ΔD of the negative electrode-side relay SMRG that was closed after the positive electrode-side relay SMRB, based on the set values of the first and the second abnormality flags F1 and F2 obtained at step S250 (step S257). More specifically, at step S257, the main ECU 10 derives the increased amount of stress ΔD corresponding to the set values of the first and the second abnormality flags F1 and F2 obtained at step S250 from the stress increase map described above (shown in FIG. 4). The main ECU 10 then adds the derived increased amount of stress ΔD to a previous value of the stress index DG of the negative electrode-side relay SMRG that was closed after the positive electrode-side relay SMRB to update (calculate) the stress index DG (step S259). The main ECU 10 subsequently shifts the state of the electric vehicle EV to the READY-ON state that enables the electric vehicle EV to be driven (step S210) and then terminates the routine of FIG. 2.

Figure 5:
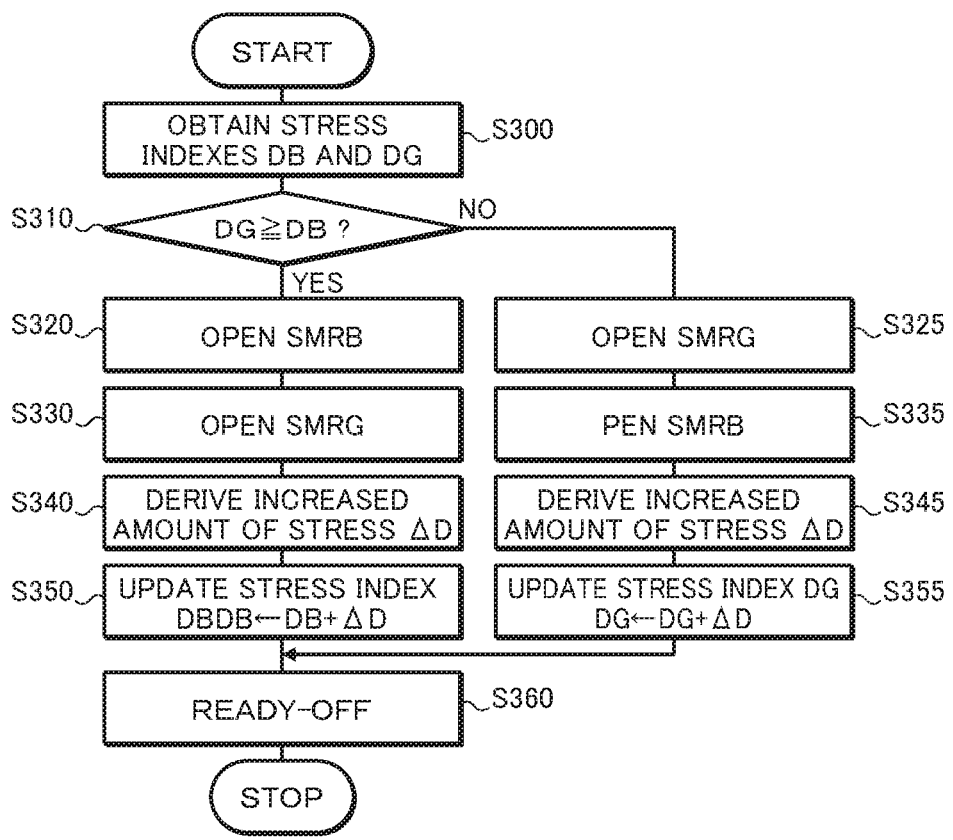
FIG. 5 is a flowchart showing one example of a routine performed by the control device of the power supply system of the embodiment, in response to a system stop request.

The following describes a control procedure of the power supply system 1 when the driver turns off the start switch SS to stop the system of the electric vehicle EV with reference to FIG. 5. FIG. 5 is a flowchart showing one example of a routine performed by the main ECU 10 in response to the driver's OFF operation of the start switch SS to make a system stop request of the electric vehicle EV. At the time when the start switch SS is turned off, both the positive electrode-side system main relay SMRB and the negative electrode-side main relay SMRG may be closed or at least one of the positive electrode-side system main relay SMRB and the negative electrode-side main relay SMRG may be opened.

When the routine of FIG. 5 is triggered, the main ECU 10 obtains the stress index DB of the positive electrode-side relay SMRB and the stress index DG of the negative electrode-side relay SMRG (step S300). The main ECU 10 subsequently determines whether the stress index DG obtained at step S300 is equal to or larger than the stress index DB obtained at step S300 (step S310). When it is determined at step S310 that the stress index DG is equal to or larger than the stress index DB (step S310: YES), the main ECU 10 cuts off the supply of the exciting current to the positive electrode-side relay SMRB to open (only) the positive electrode-side relay SMRB (step S320). The main ECU 10 then cuts off the supply of the exciting current to the negative electrode-side relay SMRG, so as to open the negative electrode-side relay SMRG after the positive electrode-side relay SMRB is fully opened (step S330). This applies the stress accompanied with opening to the positive electrode-side relay SMRB that has the less accumulated stress compared with the negative electrode-side relay SMRG. This accordingly suppresses the stresses from being unevenly accumulated in the negative electrode-side relay SMRG.

The main ECU 10 subsequently derives the increased amount of stress ΔD of the positive electrode-side relay SMRB that was opened prior to the negative electrode-side relay SMRG (step S340). At step S340, for example, a predetermined fixed value (positive real number) may be derived as the increased amount of stress ΔD. In another example, a value suitable for the situation may be selected among a plurality of values (positive real numbers) that are determined in advance by taking into account an abnormality in the power supply system 1 and may be derived as the increased amount of stress ΔD. A larger value may be set to the increased amount of stress ΔD, when there is a need to open the positive electrode-side relay SMRB and the negative electrode-side relay SMRG within a limited time period, for example, when there is a need to urgently shut down the power supply system 1. After deriving the increased amount of stress ΔD, the main ECU 10 adds the derived increased amount of stress ΔD to a previous value of the stress index DB of the positive electrode-side relay SMRB that was opened prior to the negative electrode-side relay SMRG to update (calculate) the stress index DB (step S350). The main ECU 10 subsequently shifts the state of the electric vehicle EV from the Ready state (drivable state: READY-ON state) to a Not Ready state (undrivable state: READY-OFF state) (step S360) and then terminates the routine of FIG. 5.

When it is determined at step S310 that the stress index DG is smaller than the stress index DB (step S310: NO), on the other hand, the main ECU 10 cuts off the supply of the exciting current to the negative electrode-side relay SMRG to open (only) the negative electrode-side relay SMRG (step S325). The main ECU 10 then cuts off the supply of the exciting current to the positive electrode-side relay SMRB, so as to open the positive electrode-side relay SMRB after the negative electrode-side relay SMRG is fully opened (step S335). This applies the stress accompanied with opening to the negative electrode-side relay SMRG that has the less accumulated stress compared with the positive electrode-side relay SMRB. This accordingly suppresses the stresses from being unevenly accumulated in the positive electrode-side relay SMRB.

The main ECU 10 subsequently derives the increased amount of stress ΔD of the negative electrode-side relay SMRG that was opened prior to the positive electrode-side relay SMRB (step S345) in a similar manner to the processing of step S340. After deriving the increased amount of stress ΔD, the main ECU 10 adds the derived increased amount of stress ΔD to a previous value of the stress index DG of the negative electrode-side relay SMRG that was opened prior to the positive electrode-side relay SMRB to update (calculate) the stress index DG (step S355). The main ECU 10 subsequently shifts the state of the electric vehicle EV from the READY-ON state (drivable state) to the READY-OFF state (undrivable state) (step S360) and then terminates the routine of FIG. 5.

As described above, in response to the driver's ON operation of the start switch SS to make a system start request, the power supply system 1 closes the positive electrode-side relay SMRB and the negative electrode-side relay SMRG always at different timings after precharge of the capacitor 32 of the PCU 3, and changes the sequence of closing the positive electrode-side relay SMRB and the negative electrode-side relay SMRG in accordance with the magnitude relationship of the stress indexes DB and DG (predetermined restriction) (steps S200 in FIG. 2 and steps S250 to S259 in FIG. 3). This configuration suppresses the stresses accompanied with closing from being unevenly accumulated in one of the positive electrode-side relay SMRB and the negative electrode-side relay SMRG. As a result, this configuration effectively extends the lives of the positive electrode-side relay SMRB and the negative electrode-side relay SMRG in the power supply system 1.

Furthermore, the power supply system 1 calculates the stress indexes DB and DG indicating at least the stresses accompanied with closing that are respectively accumulated into the positive electrode-side relay SMRB and the negative electrode-side relay SMRG (steps S258 and S259 in FIG. 3) and closes one of the positive electrode-side relay SMRB and the negative electrode-side relay SMRG having the larger stress index DB or DG, prior to the other (steps S250 to S255 in FIG. 3). This configuration enables the stresses accompanied with closing to be more evenly accumulated into the positive electrode-side relay SMRB and the negative electrode-side relay SMRG. This configuration thus more effectively extends the lives of the positive electrode-side relay SMRB and the negative electrode-side relay SMRG.

Moreover, the power supply system 1 calculates the stress indexes DB and DG by taking into account the stresses respectively accumulated into the positive electrode-side relay SMRB and the negative electrode-side relay SMRG accompanied with opening of the positive electrode-side relay SMRB and the negative electrode-side relay SMRG (steps S350 and S355 in FIG. 5). In response to the driver's OFF operation of the start switch SS to make a system stop request, the power supply system 1 opens one of the positive electrode-side relay SMRB and the negative electrode-side relay SMRG having the smaller stress index DB or DG, prior to the other (steps S310 to S355 in FIG. 5). This configuration enables the stresses accompanied with opening to be more evenly accumulated into the positive electrode-side relay SMRB and the negative electrode-side relay SMRG. This configuration thus more effectively extends the lives of the positive electrode-side relay SMRB and the negative electrode-side relay SMRG.

Figure 6:
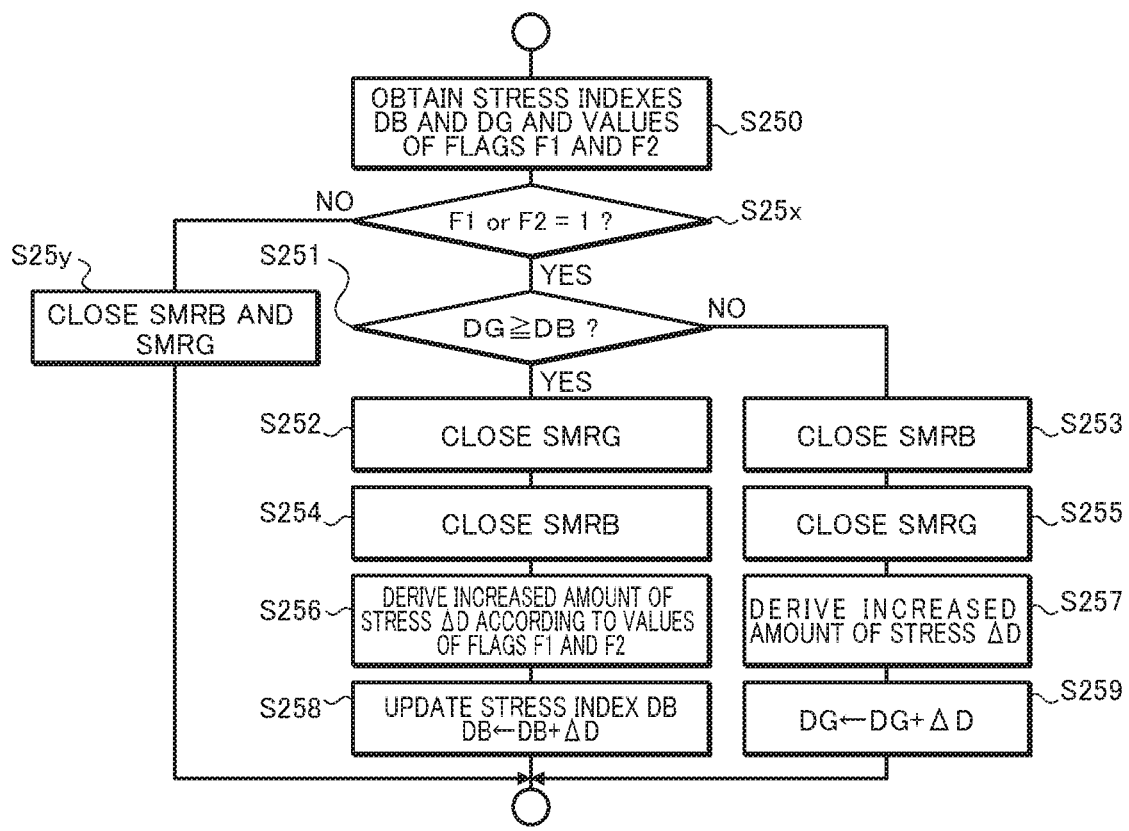
FIG. 6 is a flowchart showing another example of the procedure of closing the positive electrode-side relay and the negative electrode-side relay at step S200 shown in FIG. 2.

FIG. 6 is a flowchart showing another example of the procedure of closing the positive electrode-side relay SMRB and the negative electrode-side relay SMRG performed at step S200 of FIG. 2.

In the case where the positive electrode-side relay SMRB and the negative electrode-side relay SMRG are closed according to the procedure of FIG. 6 after precharge of the capacitor 32 of the PCU 3, the main ECU 10 obtains the stress index DB of the positive electrode-side relay SMRB, the stress index DG of the negative electrode-side relay SRMG, and the set values of the first and the second abnormality flags F1 and F2 (step S250) and determines whether at least one of the obtained first and second abnormality flags F1 and F2 is equal to the value 1 (step S25x). When it is determined at step S25x that at least one of the first and the second abnormality flags F1 and F2 is equal to the value 1 (step S25x: YES), this suggests an abnormality in precharge that allows for a system start. In this case, the main ECU subsequently determines whether the stress index DG obtained at step S250 is equal to or larger than the stress index DB obtained at step S250 (step S251). The main ECU 10 then performs either the processing of steps S252 to S258 or the processing of steps S253 to S259 according to the magnitude relationship between the stress index DG and the stress index DB.

When it is determined at step S25x that both the first and the second abnormality flags F1 and F2 are equal to the value 0 (step S25x: NO), on the other hand, this suggests no abnormality in precharge. In this case, the main ECU 10 supplies the exciting current to both the positive electrode-side relay SMRB and the negative electrode-side relay SMRG to simultaneously close the positive electrode-side relay SMRB and the negative electrode-side relay SMRG (step S25y). After the processing of step S258, step S259 or step S25y, the main ECU 10 shifts the state of the electric vehicle EV to the READY-ON state (step S210) and then terminates the routine of FIG. 2.

As described above, when the positive electrode-side relay SMRB and the negative electrode-side relay SMRG are to be closed in the event of an abnormality in precharge, such as a failure to obtain the voltage across terminals VB of the high voltage battery 2 or a failure to send the target voltage Vtag (step S25x: YES), one of the positive electrode-side relay SMRB and the negative electrode-side relay SMRG having the larger stress index DB or DG may be closed prior to the other (steps S251 to S255 in FIG. 6). This configuration causes the stress accompanied with closing in the case of an increased voltage difference between the high voltage battery 2 and the capacitor 32, which is increased due to an abnormality in precharge of the capacitor 32 to be larger than a voltage difference in the ordinary state, to be accumulated into the other of the positive electrode-side relay SMRB and the negative electrode-side relay SMRG that is closed later and that has the smaller stress index DB or DG. As a result, this suppresses reduction of the lives of the positive electrode-side relay SMRB and the negative electrode-side relay SMRG caused by the abnormality in precharge of the capacitor 32. Additionally, this configuration changes the sequence of closing the positive electrode-side relay SMRB and the negative electrode-side relay SMRG according to the magnitude relationship of the stress indexes DB and DG only in the event of an abnormality in precharge of the capacitor 32. This configuration causes the positive electrode-side relay SMRB and the negative electrode-side relay SMRG to be almost simultaneously closed (step S25y) in the case of no abnormality in precharge of the capacitor 32 (step S25x: NO). This shortens the time period required for the system start.

Figure 7:
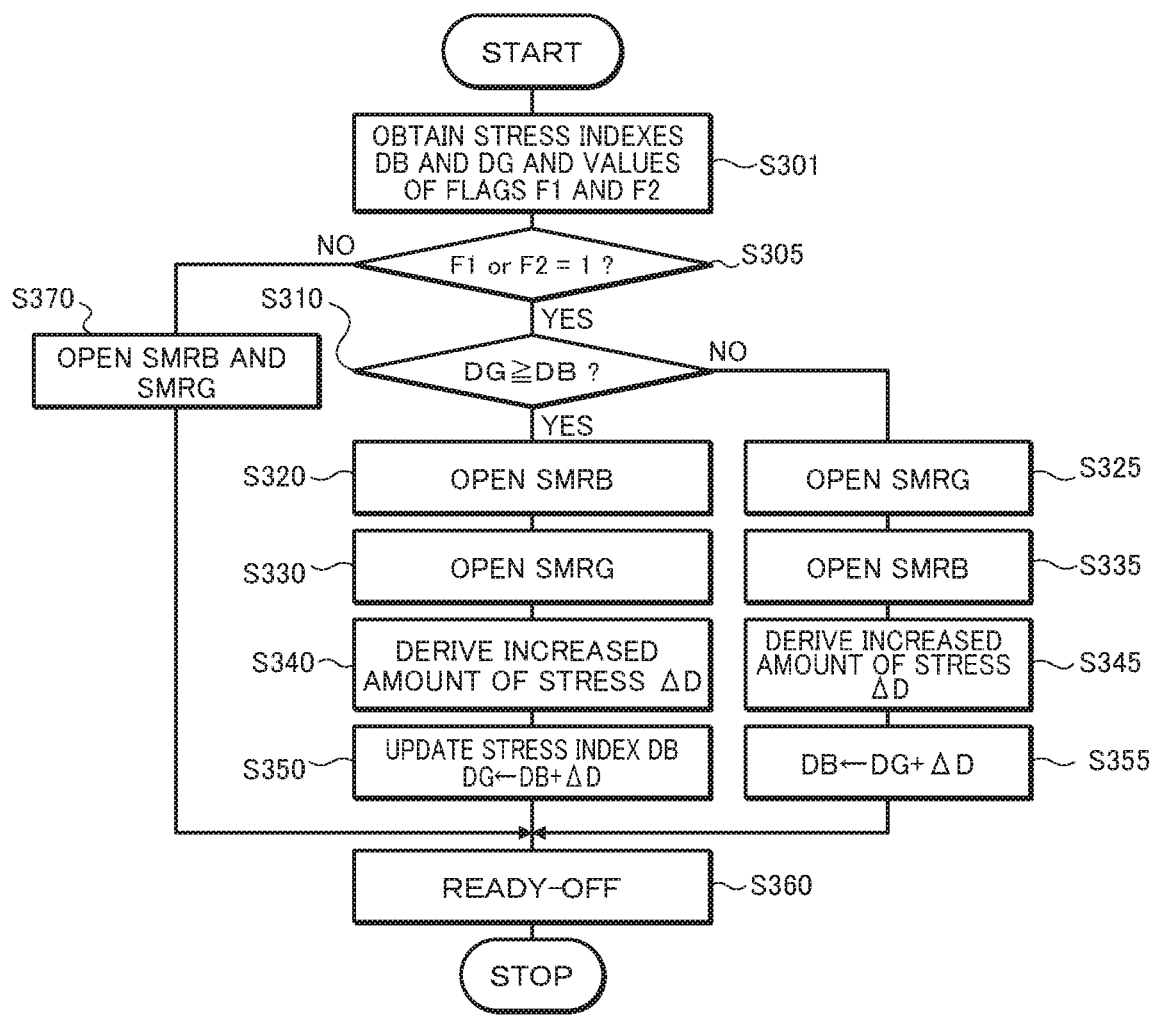
FIG. 7 is a flowchart showing another example of the routine performed by the control device of the power supply system of the embodiment, in response to a system stop request.

FIG. 7 is a flowchart showing another example of the routine performed by the main ECU 10 in response to the driver's OFF operation of the start switch SS to make a system stop request of the electric vehicle EV.

When the routine of FIG. 7 is triggered, the main ECU 10 obtains the stress index DB of the positive electrode-side relay SMRB, the stress index DG of the negative electrode-side relay SRMG, and the set values of the first and the second abnormality flags F1 and F2 (step S300). The main ECU 10 subsequently determines whether at least one of the obtained first and second abnormality flags F1 and F2 is equal to the value 1 (step S305). When it is determined at step S305 that at least one of the first and the second abnormality flags F1 and F2 is equal to the value 1 (step S305: YES), this suggests an abnormality in precharge that allows for a system start. In this case, the main ECU 10 subsequently determines whether the stress index DG obtained at step S300 is equal to or larger than the stress index DB obtained at step S300 (step S310). The main ECU 10 then performs either the processing of steps S320 to S350 or the processing of steps S325 to S355 according to the magnitude relationship between the stress index DG and the stress index DB.

When it is determined at step S305 that both the first and the second abnormality flags F1 and F2 are equal to the value 0 (step S305: NO), on the other hand, this suggests no abnormality in precharge. In this case, the main ECU 10 cuts off the supply of the exciting current to both the positive electrode-side relay SMRB and the negative electrode-side relay SMRG to simultaneously open the positive electrode-side relay SMRB and the negative electrode-side relay SMRG (step S370). After the processing of step S350, step S355 or step S370, the main ECU 10 shifts the state of the electric vehicle EV to the READY-OFF state (step S360) and then terminates the routine of FIG. 7.

As described above, when the positive electrode-side relay SMRB and the negative electrode-side relay SMRG are closed in the event of an abnormality in precharge, such as a failure to obtain the voltage across terminals VB of the high voltage battery 2 or a failure to send the target voltage Vtag, one of the positive electrode-side relay SMRB and the negative electrode-side relay SMRG having the smaller stress index DB or DG may be opened prior to the other, in response to a subsequent system stop request (steps S305 to S335 in FIG. 7). This configuration more effectively suppresses reduction of the lives of the positive electrode-side relay SMRB and the negative electrode-side relay SMRG caused by the abnormality in precharge of the capacitor 32.

Figure 8:
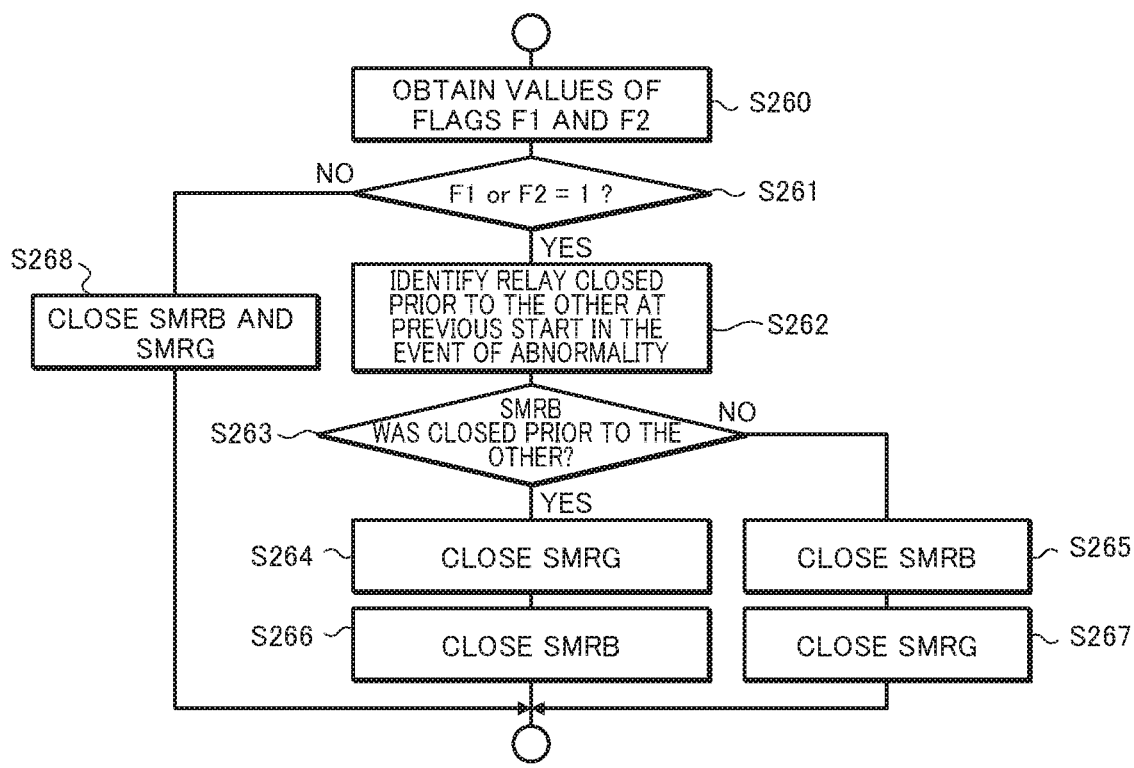
FIG. 8 is a flowchart showing another example of the procedure of closing the positive electrode-side relay and the negative electrode-side relay at step S200 shown in FIG. 2.

FIG. 8 is a flowchart showing another example of the procedure of closing the positive electrode-side relay SMRB and the negative electrode-side relay SMRG performed at step S200 of FIG. 2.

In the case where the positive electrode-side relay SMRB and the negative electrode-side relay SMRG are closed according to the procedure of FIG. 8 after precharge of the capacitor 32 of the PCU 3, the main ECU 10 obtains the set values of the first and the second abnormality flags F1 and F2 (step S260) and determines whether at least one of the obtained first and second abnormality flags F1 and F2 is equal to the value 1 (step S261). When it is determined at step S261 that at least one of the first and the second abnormality flags F1 and F2 is equal to the value 1 (step S261: YES), this suggests an abnormality in precharge that allows for a system start. In this case, the main ECU 10 identifies which of the positive electrode-side relay SMRB and the negative electrode-side relay SMRG was closed prior to the other at the time of a previous system start in the event of an abnormality in precharge (step S262).

When it is determined that the positive electrode-side relay SMRB was closed prior to the negative electrode-side relay SMRG (step S263: YES) as a result of the processing of step S262, the main ECU 10 supplies the exciting current to the negative electrode-side relay SMRG to close (only) the negative electrode-side relay SMRG (step S264). The main ECU 10 then supplies the exciting current to the positive electrode-side relay SMRB, so as to close the positive electrode-side relay SMRB after the negative electrode-side relay SMRG is fully closed (step S266). When it is determined that the negative electrode-side relay SMRG was closed prior to the positive electrode-side relay SMRB (step S263: NO) as a result of the processing of step S262, on the other hand, the main ECU 10 supplies the exciting current to the positive electrode-side relay SMRB to close (only) the positive electrode-side relay SMRB (step S265). The main ECU 10 then supplies the exciting current to the negative electrode-side relay SMRG, so as to close the negative electrode-side relay SMRG after the positive electrode-side relay SMRB is fully closed (step S267).

When it is determined at step S261 that both the first and the second abnormality flags F1 and F2 are equal to the value 0 (step S261: NO), on the other hand, this suggests no abnormality in precharge. In this case, the main ECU 10 supplies the exciting current to both the positive electrode-side relay SMRB and the negative electrode-side relay SMRG to simultaneously close the positive electrode-side relay SMRB and the negative electrode-side relay SMRG (step S268). After the processing of step S266, step S267 or step S268, the main ECU 10 shifts the state of the electric vehicle EV to the READY-ON state (step S210) and then terminates the routine of FIG. 2.

As described above, when the positive electrode-side relay SMRB and the negative electrode-side relay SMRG are to be closed in the event of an abnormality in precharge, such as a failure to obtain the voltage across terminals VB of the high voltage battery 2 or a failure to send the target voltage Vtag (step S261: YES), one of the positive electrode-side relay SMRB and the negative electrode-side relay SMRG that was not closed prior to the other at the time of a previous system start in the event of an abnormality in precharge may be closed prior to the other (steps S262 to S267 in FIG. 8). Accordingly, when the positive electrode-side relay SMRB and the negative electrode-side relay SMRG are to be closed in the event of an abnormality in precharge of the capacitor 32, one of the positive electrode-side relay SMRB and the negative electrode-side relay SMRG may be closed alternately prior to the other in response to every system start request.

This configuration suppresses the stresses accompanied with closing in the case of an increased voltage difference between the high voltage battery 2 and the capacitor 32, which is increased due to an abnormality in precharge of the capacitor 32 to be larger than a voltage difference in the ordinary state, from being unevenly accumulated in one of the positive electrode-side relay SMRB and the negative electrode-side relay SMRG. As a result, this effectively suppresses reduction of the lives of the positive electrode-side relay SMRB and the negative electrode-side relay SMRG caused by the abnormality in precharge of the capacitor 32. Additionally, the routine shown in FIG. 8 causes the positive electrode-side relay SMRB and the negative electrode-side relay SMRG to be almost simultaneously closed (step S268) in the case of no abnormality in precharge of the capacitor 32 (step S261: NO). This shortens the time period required for the system start.

When the positive electrode-side relay SMRB and the negative electrode-side relay SMRG are to be opened in response to a system stop request after execution of the routine of FIG. 8, the positive electrode-side rely SMRB and the negative electrode-side relay SMRG may be opened almost simultaneously or one of the positive electrode-side relay SMRB and the negative electrode-side relay SMRG that was closed prior to the other in response to a last system start request (immediately before the current system stop request) may be opened prior to the other in response to the system stop request.

Figure 9:
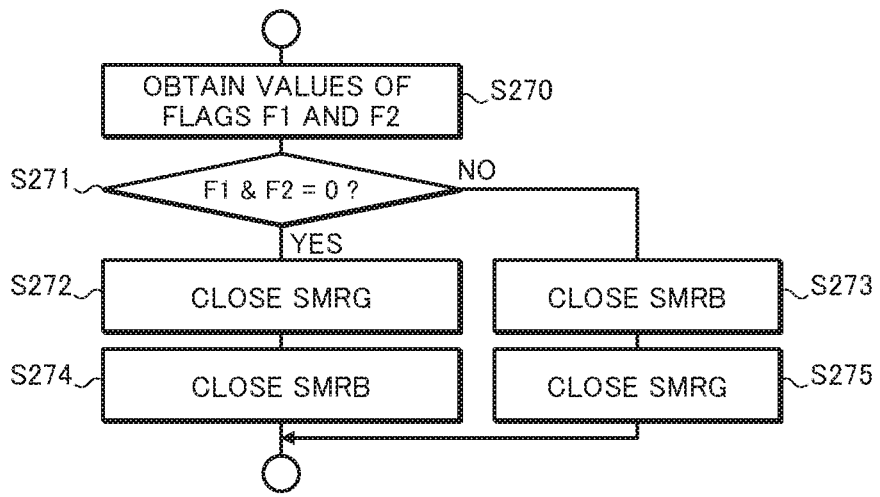
FIG. 9 is a flowchart showing another example of the procedure of closing the positive electrode-side relay and the negative electrode-side relay at step S200 shown in FIG. 2.

FIG. 9 is a flowchart showing another example of the procedure of closing the positive electrode-side relay SMRB and the negative electrode-side relay SMRG performed at step S200 of FIG. 2.

In the case where the positive electrode-side relay SMRB and the negative electrode-side relay SMRG are closed according to the procedure of FIG. 9 after precharge of the capacitor 32 of the PCU 3, the main ECU 10 obtains the set values of the first and the second abnormality flags F1 and F2 (step S270) and determines whether both the obtained first and second abnormality flags F1 and F2 are equal to the value 0 (step S271). When it is determined at step S271 that both the first and the second abnormality flags F1 and F2 are equal to the value 0 (step S271: YES), this suggests no abnormality in precharge. In this case, the main ECU 10 supplies the exciting current to the negative electrode-side relay SMRG to close (only) the negative electrode-side relay SMRG (step S272). The main ECU 10 then supplies the exciting current to the positive electrode-side relay SMRB, so as to close the positive electrode-side relay SMRB after the negative electrode-side relay SMRG is fully closed (step S274).

When it is determined at step S271 that at least one of the first and the second abnormality flags F1 and F2 is equal to the value 1 (step S271: NO), on the other hand, this suggests an abnormality in precharge that allows for a system start. In this case, the main ECU 10 supplies the exciting current to the positive electrode-side relay SMRB to close (only) the positive electrode-side relay SMRB (step S273). The main ECU 10 then supplies the exciting current to the negative electrode-side relay SMRG, so as to close the negative electrode-side relay SMRG after the positive electrode-side relay SMRB is fully closed (step S275). After the processing of either step S274 or step S275, the main ECU 10 shifts the state of the electric vehicle EV to the READY-ON state (step S210) and then terminates the routine of FIG. 2.

As a result of execution of the routine of FIG. 9 described above, in the case of no abnormality in precharge of the capacitor 32 (step S271: YES), the negative electrode-side relay SMRG is closed always prior to the positive electrode-side relay SMRB (steps S272 and S274) in response to a system start request. When the positive electrode-side relay SMRB and the negative electrode-side relay SMRG are to be closed in the event of an abnormality in precharge, such as a failure to obtain the voltage across terminals VB of the high voltage battery 2 or a failure to send the target voltage Vtag (step S271: NO), on the other hand, the positive electrode-side relay SMRB is closed always prior to the negative electrode-side relay SMRG in response to a system start request (steps S273 and S275).

Accordingly, in the case of no abnormality in precharge of the capacitor 32, the stress accompanied with closing is not accumulated into the negative electrode-side relay SMRG. The stress (electrical stress) accompanied with closing in the event of an abnormality in precharge of the capacitor 32 is applied to the negative electrode-side relay SMRG. As a result, this configuration causes the total stress accumulated in the positive electrode-side relay SMRB and the total stress accumulated in the negative electrode-side relay SMRG to become close to each other. Accordingly, this configuration more effectively extends the lives of the positive electrode-side relay SMRB and the negative electrode-side relay SMRG. In the routine of FIG. 9, in the case of no abnormality in precharge of the capacitor 32, the positive electrode-side relay SMRB may be closed prior to the negative electrode-side relay SMRG in response to a system start request. In the event of an abnormality in precharge of the capacitor 32, the negative electrode-side relay SMRG may be closed prior to the positive electrode-side relay SMRB.

Figure 10:
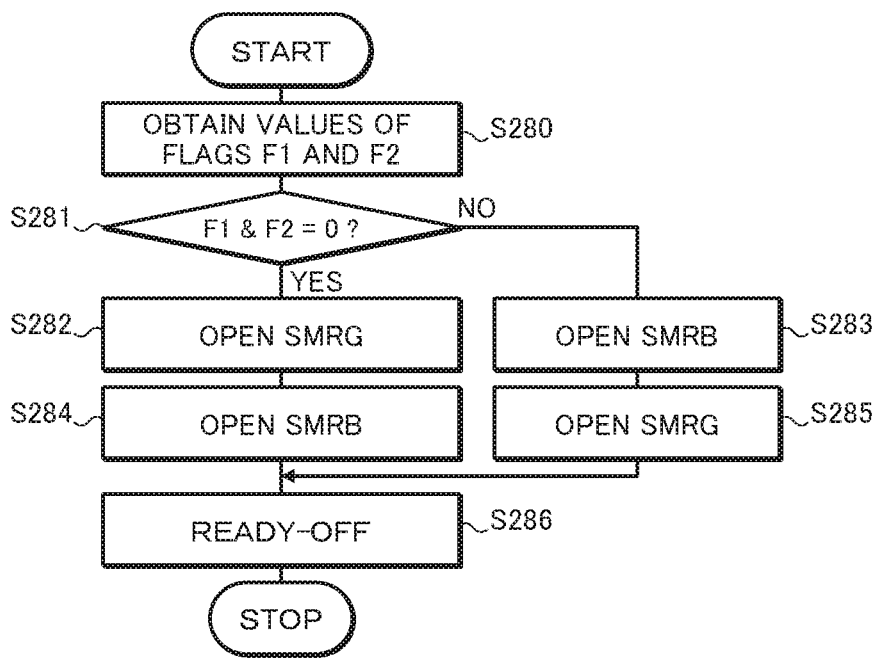
FIG. 10 is a flowchart showing one example of a routine performed by the control device of the power supply system of the embodiment, in response to a system stop request after execution of the routine of FIG. 9.

FIG. 10 is a flowchart showing one example of a routine that is performed by the main ECU 10 in response to the driver's OFF operation of the start switch SS to make a system stop request of the electric vehicle EV after execution of the routine of FIG. 9.

When the routine of FIG. 10 is triggered, the main ECU 10 obtains the set values of the first and the second abnormality flags F1 and F2 (step S280) and determines whether both the obtained first and second abnormality flags F1 and F2 are equal to the value 0 (step S281). When it is determined at step S281 that both the first and the second abnormality flags F1 and F2 are equal to the value 0 (step S281: YES), this suggests no abnormality in precharge. In this case, the main ECU 10 cuts off the supply of the exciting current to the negative electrode-side relay SMRG to open (only) the negative electrode-side relay SMRG (step S282). The main ECU 10 then cuts off the supply of the exciting current to the positive electrode-side relay SMRB, so as to open the positive electrode-side relay SMRB after the negative electrode-side relay SMRG is fully opened (step S284).

When it is determined at step S281 that at least one of the first and the second abnormality flags F1 and F2 is equal to the value 1 (step S281: NO), on the other hand, this suggests an abnormality in precharge that allows for a system start. In this case, the main ECU 10 cuts off the supply of the exciting current to the positive electrode-side relay SMRB to open (only) the positive electrode-side relay SMRB (step S283). The main ECU 10 then cuts off the supply of the exciting current to the negative electrode-side relay SMRG, so as to open the negative electrode-side relay SMRG after the positive electrode-side relay SMRB is fully opened (step S285). After the processing of either step S284 or step S285, the main ECU 10 shifts the state of the electric vehicle EV to the READY-OFF state (step S286) and then terminates the routine of FIG. 10.

As a result of execution of the routine of FIG. 10 described above, in the case of no abnormality in precharge of the capacitor 32 (step S281: YES), the negative electrode-side relay SMRG is opened always prior to the positive electrode-side relay SMRB (steps S282 and S284) in response to a system stop request. After the positive electrode-side relay SMRB and the negative electrode-side relay SMRG were closed in the event of an abnormality in precharge, such as a failure to obtain the voltage across terminals VB of the high voltage battery 2 or a failure to send the target voltage Vtag (step S281: NO), on the other hand, the positive electrode-side relay SMRB is opened always prior to the negative electrode-side relay SMRG in response to a system stop request (steps S283 and S285).

This configuration causes the total stress accumulated in the positive electrode-side relay SMRB and the total stress accumulated in the negative electrode-side relay SMRG to become closer to each other. In the routine of FIG. 10, in the case of no abnormality in precharge of the capacitor 32, the negative electrode-side relay SMRG may be opened prior to the positive electrode-side relay SMRB in response to a system stop request. After the positive electrode-side relay SMRB and the negative electrode-side relay SMRG are closed in the event of an abnormality in precharge of the capacitor 32, the negative electrode-side relay SMRG may be opened prior to the positive electrode-side relay SMRB in response to a system stop request.

Figure 11:
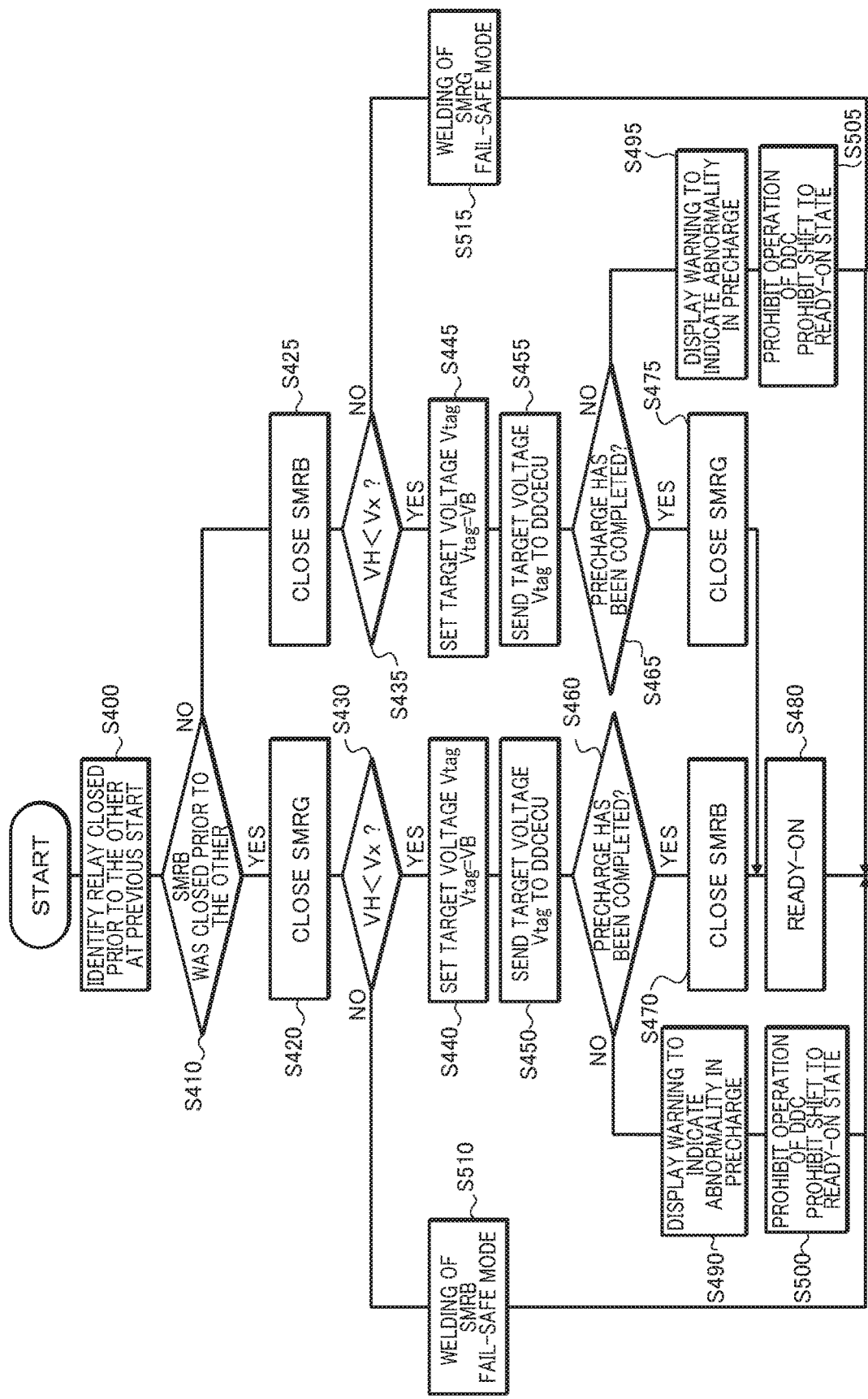
FIG. 11 is a flowchart showing another example of the routine performed by the control device of the power supply system of the embodiment, in response to a system start request.

FIG. 11 is a flowchart showing another example of the routine performed by the main ECU 10 in response to the driver's ON operation of the start switch SS to make a system start request of the electric vehicle EV including the power supply system 1.

When the driver turns on the start switch SS, the main ECU 10 (CPU) identifies which of the positive electrode-side relay SMRB and the negative electrode-side relay SMRG was closed prior to the other at the time of a previous system start (step S400) as shown in FIG. 11. When it is determined that the positive electrode-side relay SMRB was closed prior to the negative electrode-side relay SMRG at the time of a previous system start (step S410: YES) as a result of the processing of step S400, the main ECU 10 supplies the exciting current to the negative electrode-side relay SMRG to close (only) the negative electrode-side relay SMRG (step S420). After the processing of step S420, the main ECU 10 obtains the voltage across terminals VH of the capacitor 32 detected by the voltage sensor 33 at the timing when the negative electrode-side relay SMRG is fully closed and determines whether the obtained voltage across terminals VH is lower than a predetermined reference value Vx (step S430).

In the event of welding (sticking, or ON failure) of the positive electrode-side relay SMRB, closing the negative electrode-side relay SMRG causes a voltage to be applied from the high voltage battery 2 to the capacitor 32 and thereby increases the voltage across terminals VH. Accordingly, when it is determined that the voltage across terminals VH of the capacitor 32 is equal to or higher than the reference value Vx (step S430: NO), this suggests welding of the positive electrode-side relay SMRB. In this case, the main ECU 10 shifts the state of the electric vehicle EV to a fail-safe mode (step S510) and then terminates the routine of FIG. 11.

When it is determined at step S430 that the voltage across terminals VH of the capacitor 32 is lower than the reference value Vx (step S430: YES), on the other hand, this suggests no welding of the positive electrode-side relay SMRB. In this case, the main ECU 10 obtains the voltage across terminals VB of the high voltage battery 2 detected by the voltage sensor 21 and sets the obtained voltage across terminals VB to the target voltage Vtag for precharge of the capacitor 32 of the PCU 3 (step S440). The main ECU 10 subsequently sends the set target voltage Vtag to the DDCECU 40 of the bidirectional DC/DC converter 34 (step S450) and determines whether precharge of the capacitor 32 has been normally completed (step S460).

When it is determined at step S460 that precharge of the capacitor 32 has been normally completed (step S460: YES), the main ECU 10 supplies the exciting current to the positive electrode-side relay SMRB to close the positive electrode-side relay SMRB (step S470). The main ECU 10 shifts the state of the electric vehicle EV to the READY-ON state (step S480) at a timing when the positive electrode-side relay SMRB is completely closed, and then terminates the routine of FIG. 11. When it is determined at step S460 that precharge of the capacitor 32 has not been normally completed (step S460: NO), on the other hand, the main ECU 10 turns on the warning light provided on the instrument panel (not shown) or the like (step S490), in order to indicate an abnormality in precharge using the bidirectional DC/DC converter 34. The main ECU 10 also prohibits the operation of the bidirectional DC/DC converter 34 and the shift of the state of the electric vehicle EV to the READY-ON state (step S500) and then terminates the routine of FIG. 11.

When it is determined that the negative electrode-side relay SMRG was closed prior to the positive electrode-side relay SMRB at the time of the previous system start (step S410: NO) as a result of the processing of step S400, on the other hand, the main ECU 10 supplies the exciting current to the positive electrode-side relay SMRB to close (only) the positive electrode-side relay SMRB (step S425). After the processing of step S425, the main ECU 10 obtains the voltage across terminals VH of the capacitor 32 detected by the voltage sensor 33 at the timing when the positive electrode-side relay SMRB is fully closed and determines whether the obtained voltage across terminals VH is lower than the predetermined reference value Vx (step S435).

When it is determined that the voltage across terminals VH of the capacitor 32 is equal to or higher than the reference value Vx (step S435: NO), this suggests welding of the negative electrode-side relay SMRG. In this case, the main ECU 10 shifts the state of the electric vehicle EV to the fail-safe mode (step S515) and then terminates the routine of FIG. 11. When it is determined at step S435 that the voltage across terminals VH of the capacitor 32 is lower than the reference value Vx (step S435: YES), on the other hand, this suggests no welding of the negative electrode-side relay SMRG. In this case, the main ECU 10 obtains the voltage across terminals VB of the high voltage battery 2 detected by the voltage sensor 21 and sets the obtained voltage across terminals VB to the target voltage Vtag for precharge of the capacitor 32 of the PCU 3 (step S445). The main ECU 10 subsequently sends the set target voltage Vtag to the DDCECU 40 of the bidirectional DC/DC converter 34 (step S455) and determines whether precharge of the capacitor 32 has been normally completed (step S465).

When it is determined at step S465 that precharge of the capacitor 32 has been normally completed (step S465: YES), the main ECU 10 supplies the exciting current to the negative electrode-side relay SMRG to close the negative electrode-side relay SMRG (step S475). The main ECU 10 shifts the state of the electric vehicle EV to the READY-ON state (step S480) at a timing when the negative electrode-side relay SMRG is completely closed, and then terminates the routine of FIG. 11. When it is determined at step S465 that precharge of the capacitor 32 has not been normally completed (step S465: NO), on the other hand, the main ECU 10 turns on the warning light provided on the instrument panel (not shown) or the like (step S495), in order to indicate an abnormality in precharge using the bidirectional DC/DC converter 34. The main ECU 10 also prohibits the operation of the bidirectional DC/DC converter 34 and the shift of the state of the electric vehicle EV to the READY-ON state (step S505) and then terminates the routine of FIG. 11.

Figure 12:
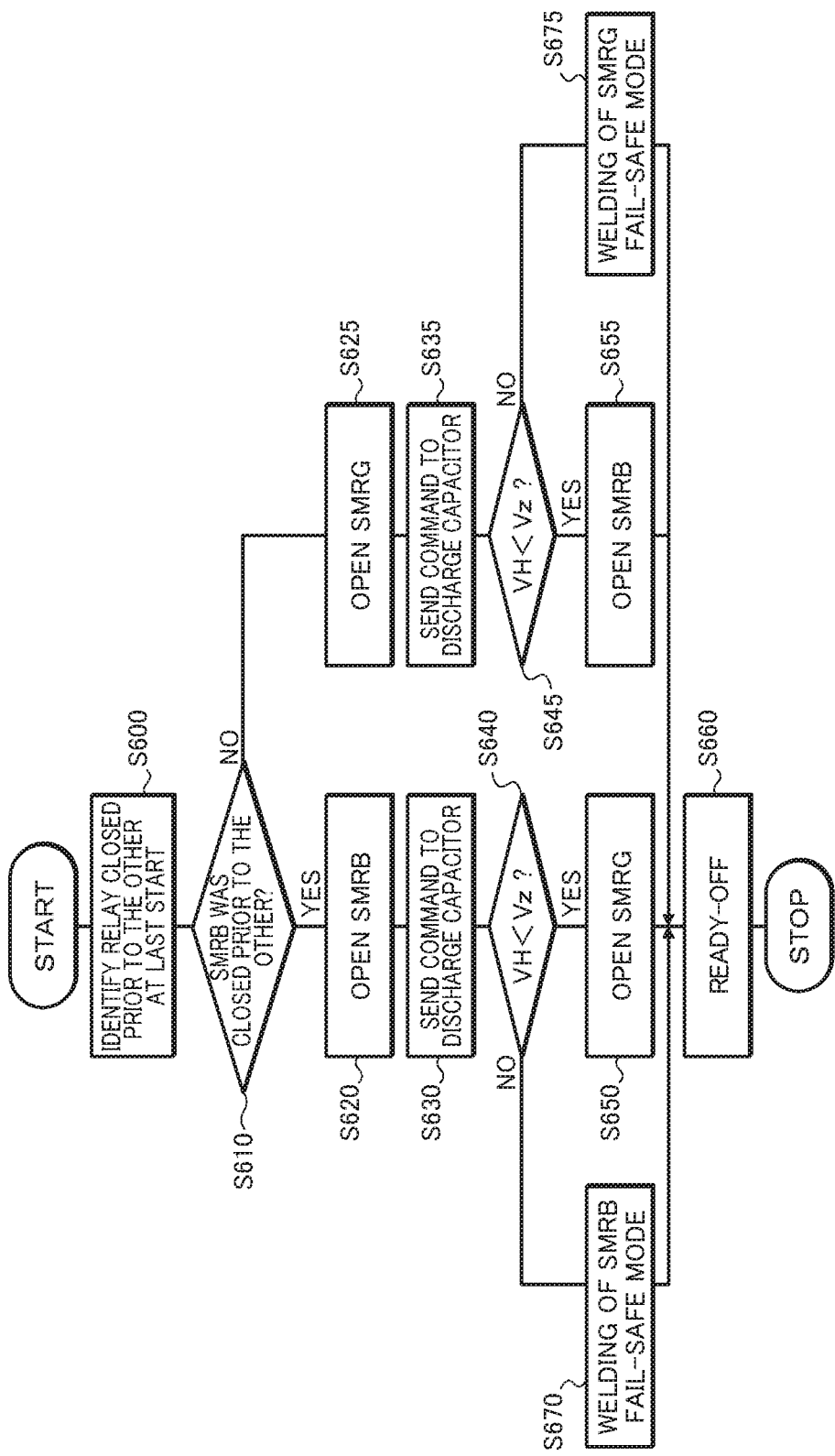
FIG. 12 is a flowchart showing one example of a routine performed by the control device of the power supply system of the embodiment, in response to a system stop request after execution of the routine of FIG. 11.

With reference to FIG. 12, the following describes a procedure of opening the positive electrode-side relay SMRB and the negative electrode-side relay SMRG in response to the driver's OFF operation of the start switch SS to make a system stop request of the electric vehicle EV after execution of the routine of FIG. 11.

When the driver turns off the start switch SS, the main ECU 10 identifies which of the positive electrode-side relay SMRB and the negative electrode-side relay SMRG was closed prior to the other at the time of a last system start (step S600) as shown in FIG. 12. When it is determined that the positive electrode-side relay SMRB was closed prior to the negative electrode-side relay SMRG at the time of a last system start (step S610: YES) as a result of the processing of step S600, the main ECU 10 cuts off the supply of the exciting current to the positive electrode-side relay SMRB to open (only) the positive electrode-side relay SMRG (step S620).

The main ECU 10 subsequently sends a command signal (switching signal) to the MGECU 30, such as to cause only a d-axis current to flow in the motor generator MG at a timing when the positive electrode-side relay SMRB is fully opened (step S630). When receiving the command signal from the main ECU 10, the MGECU 30 performs switching control of the transistors included in the inverter 31, such that the d-axis current flows in the motor generator MG. This configuration supplies the charge accumulated in the capacitor 32 as the d-axis current to the motor generator MG to convert the supplied charge into heat and thereby causes the capacitor 32 to be discharged.

After the processing of step S630, the main ECU 10 obtains the voltage across terminals VH of the capacitor 32 detected by the voltage sensor 33 when a predetermined time period has elapsed, and determines whether the obtained voltage across terminals VH is lower than a predetermined reference value Vz (step S640). The reference value Vz may be equal to the reference value Vx described above or may be different from the reference value Vx. When it is determined at step S640 that the voltage across terminals VH is equal to or higher than the reference value Vz (step S640: NO), this suggests that application of the electric current from the high voltage battery 2 to the capacitor 32 does not decrease the voltage across terminals VH, although the capacitor 32 is to be discharged. Accordingly, when the voltage across terminals VH is equal to or higher than the reference value Vz (step S640: NO), this suggests welding of the positive electrode-side relay SMRB. In this case, the main ECU 10 sets a fail-safe mode flag to ON, so as to give a start instruction to start in the fail-safe mode in response to a next system start request (i.e., a next ON operation of the start switch SS) (step S670). The main ECU 10 subsequently shifts the state of the electric vehicle EV from the READY-ON state to the READY-OFF state (step S660) and then terminates the routine of FIG. 12.

When it is determined at step S640 that the voltage across terminals VH is lower than the reference value Vz (step S640: YES), on the other hand, this suggests no welding of the positive electrode-side relay SMRB. In this case, the main ECU 10 cuts off the supply of the exciting current to the negative electrode-side relay SMRG to open the negative electrode-side relay SMRG (step S650). The main ECU 10 subsequently shifts the state of the electric vehicle EV from the READ-ON state to the READY-OFF state (step S660) at a timing when the negative electrode-side relay SMRG is fully opened, and then terminates the routine of FIG. 12.

When it is determined that the negative electrode-side relay SMRG was closed prior to the positive electrode-side relay SMRB at the time of the last system start (step S610: NO) as a result of the processing of step S600, on the other hand, the main ECU 10 cuts off the supply of the exciting current to the negative electrode-side relay SMRG to open (only) the negative electrode-side relay SMRB (step S625). The main ECU 10 subsequently sends a command signal (switching signal) to the MGECU 30, such as to cause only a d-axis current to flow in the motor generator MG at a timing when the negative electrode-side relay SMRG is fully opened (step S635). When receiving the command signal from the main ECU 10, the MGECU 30 performs switching control of the transistors included in the inverter 31, such that the d-axis current flows in the motor generator MG.

After the processing of step S635, the main ECU 10 obtains the voltage across terminals VH of the capacitor 32 detected by the voltage sensor 33 when a predetermined time period has elapsed, and determines whether the obtained voltage across terminals VH is lower than the predetermined reference value Vz (step S645). When the obtained voltage across terminals VH is equal to or higher than the reference value Vz (step S645: NO), this suggests welding of the negative electrode-side relay SMRG. In this case, the main ECU 10 sets the fail-safe mode flag to ON, so as to give a start instruction to start in the fail-safe mode in response to a next system start request (i.e., a next ON operation of the start switch SS) (step S675). The main ECU 10 subsequently shifts the state of the electric vehicle EV from the READY-ON state to the READY-OFF state (step S660) and then terminates the routine of FIG. 12.

When it is determined at step S645 that the voltage across terminals VH is lower than the reference value Vz (step S645: YES), on the other hand, this suggests no welding of the negative electrode-side relay SMRG. In this case, the main ECU 10 cuts off the supply of the exciting current to the positive electrode-side relay SMRB to open the positive electrode-side relay SMRB (step S655). The main ECU 10 subsequently shifts the state of the electric vehicle EV from the READ-ON state to the READY-OFF state (step S660) at a timing when the positive electrode-side relay SMRB is fully opened, and then terminates the routine of FIG. 12.

Figure 13:
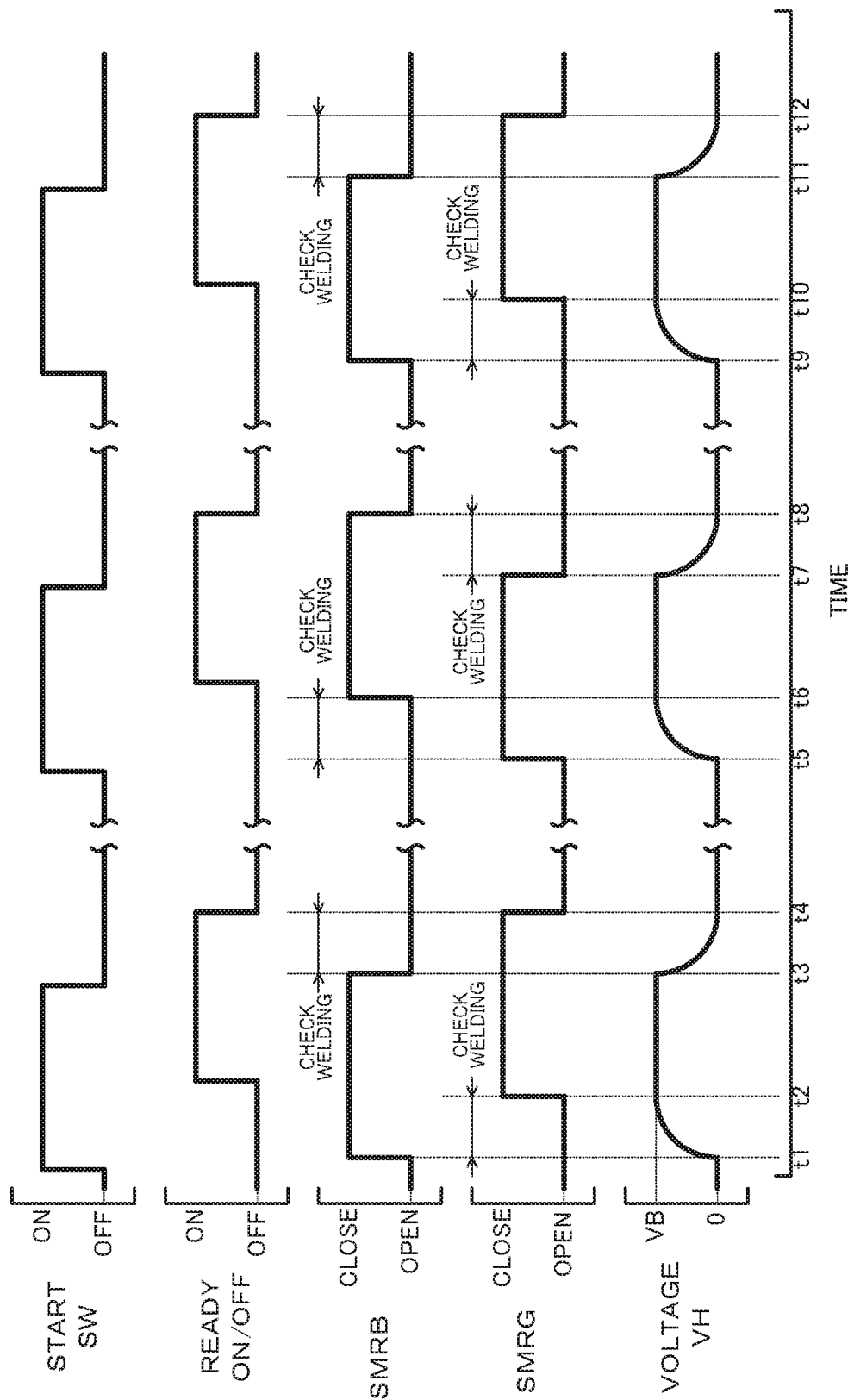
FIG. 13 is a time chart showing time changes in operating state of a start switch, READY-ON/READY-OFF (Ready/Not Ready) state, open-close states of the positive electrode-side relay and the negative electrode-side relay and voltage of a capacitor when the routines of FIG. 11 and FIG. 12 are performed.

As a result of execution of the routine shown in FIG. 12 described above, one of the positive electrode-side relay SMRB and the negative electrode-side relay SMRG that was not closed prior to the other at the time of a previous system start in response to a system start request is closed prior to the other as shown in FIG. 13 (more specifically, steps S410 to S475 shown in FIG. 11 and time periods t1 to t2, t5 to t6 and t9 to t10 shown in FIG. 13). Closing one of the positive electrode-side relay SMRB and the negative electrode-side relay SMRG alternately prior to the other in response to every system start request suppresses the stresses accompanied with closing from being unevenly accumulated in one of the positive electrode-side relay SMRB and the negative electrode-side relay SMRG. As a result, this configuration effectively extends the lives of the positive electrode-side relay SMRB and the negative electrode-side relay SMRG.

As a result of execution of the routine shown in FIG. 12 described above, one of the positive electrode-side relay SMRB and the negative electrode-side relay SMRG that was closed prior to the other in response to a last system start request is opened prior to the other in response to a system stop request as shown in FIG. 13 (more specifically, steps S610 to S655 shown in FIG. 12 and time periods t3 to t4, t7 to t8 and t11 to t12). This configuration suppresses the stresses accompanied with opening from being unevenly accumulated in one of the positive electrode-side relay SMRB and the negative electrode-side relay SMRG. As a result, this configuration more effectively extends the lives of the positive electrode-side relay SMRB and the negative electrode-side relay SMRG.

Furthermore, the routine of FIG. 11 closes one of the positive electrode-side relay SMRB and the negative electrode-side relay SMRG in response to a system start request prior to precharge of the capacitor 32 and subsequently determines welding or no welding of the other of the positive electrode-side relay SMRB and the negative electrode-side relay SMRG, based on the voltage across terminals VH of the capacitor 32 (steps S430 and S435 shown in FIG. 11 and the time periods t1 to t2, t5 to t6 and t9 to t10 shown in FIG. 13). The routine of FIG. 12 opens one of the positive electrode-side relay SMRB and the negative electrode-side relay SMRG in response to a system stop request, and subsequently causes the capacitor 32 to be discharged and determines welding or no welding of the one of the positive electrode-side relay SMRB and the negative electrode-side relay SMRG (steps S630, S640, S635 and S645 shown in FIG. 12 and the time periods t3 to t4, t7 to t8 and t11 to t12 shown in FIG. 13).

Figure 14:
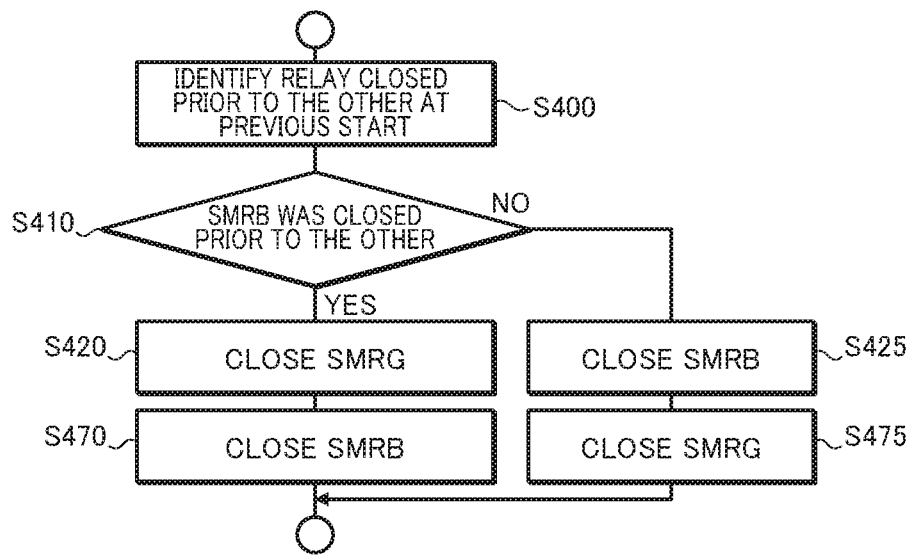
FIG. 14 is a flowchart showing another example of the procedure of closing the positive electrode-side relay and the negative electrode-side relay at step S200 shown in FIG. 2.
Figure 15:
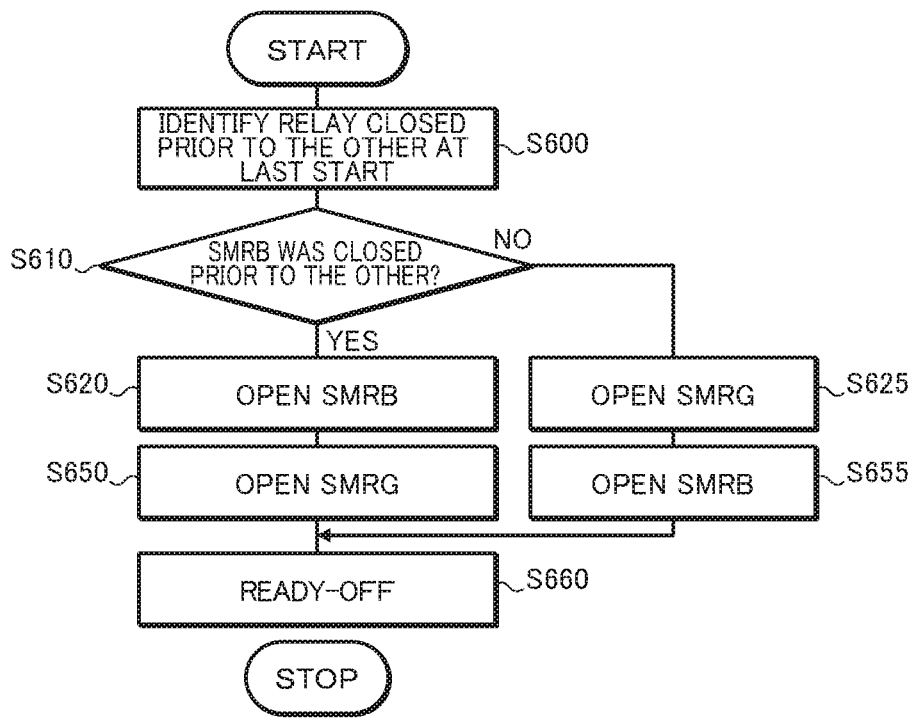
FIG. 15 is a flowchart showing another example of the routine performed by the control device of the power supply system of the embodiment, in response to a system stop request.

As understood from FIG. 13, one of the positive electrode-side relay SMRB and the negative electrode-side relay SMRG that was not subjected to determination of welding or no welding at the time of a previous system stop is closed prior to the other at the time of a next system start. As a result, this configuration favorably suppresses one of the positive electrode-side relay SMRB and the negative electrode-side relay SMRG from being welded by the flow of inrush current that flows due to welding of the other at the time when only one of the positive electrode-side relay SMRB and the negative electrode-side relay SMRG is closed. According to a modification, however, the determination steps of welding of the positive electrode-side relay SMRB and the negative electrode-side relay SMRG may be omitted from the routine of FIG. 11. For example, a procedure shown in FIG. 14 may be performed at step S200 shown in FIG. 2 (more specifically, after precharge of the capacitor 32 of the PCU 3 in response to a system start request). Similarly, as shown in FIG. 15, the determination steps of welding of the positive electrode-side relay SMRB and the negative electrode-side relay SMRG may be omitted from the routine of FIG. 12.

As described above, the power supply system 1 according to the aspect of the present disclosure includes the high voltage battery (power storage device) 2, the positive electrode-side relay SMRB, the negative electrode-side relay SMRG, the PCU 3 that includes the capacitor 32 configured to be pre-charged in response to a system start request and that is connected with the high voltage battery 2 via the positive electrode-side relay SMRB and the negative electrode-side relay SMRG, and the main ECU 10 configured as the control device to close the positive electrode-side relay SMRB and the negative electrode-side relay SMRG at different timings always or in the event of an abnormality in precharge (under the predetermined condition), in response to a system start request and to change the sequence of closing the positive electrode-side relay SMRB and the negative electrode-side relay SMRG in accordance with the predetermined restriction, such as the magnitude relationship of the stress indexes DB and DG. This configuration suppresses the stresses accompanied with closing from being unevenly accumulated in one of the positive electrode-side relay SMRB and the negative electrode-side relay SMRG. This configuration thus more effectively extends the lives of the positive electrode-side relay SMRB and the negative electrode-side relay SMRG.

According to a modification of the embodiment described above, the procedure of calculating the stress indexes DB and DG may take into account another abnormality that allows for a system start other than the failure to obtain the voltage across terminals VB of the high voltage battery 2 and the failure to send the target voltage Vtag. At steps S430 and S435 shown in FIG. 11 and at steps S640 and S645 shown in FIG. 12, a modification may determine whether the electric current flows from the high voltage battery 2 to the PCU 3-side based on the detected value of the current sensor 22, in place of comparing the voltage across terminals VH of the capacitor 32 with the reference value Vx or the reference value Vz.

Furthermore, the bidirectional DC/DC converter 34 may be controlled by the main ECU 10, instead of being controlled by the dedicated DDCECU 40. In the power supply system 1, the bidirectional DC/DC converter 34 may be replaced by a DC/DC converter without the function of stepping down the voltage of electric power from the high voltage battery 2- and the PCU 3-side. In this modification, for example, a precharge circuit including a precharge relay and a resistance may be provided in parallel with the negative electrode-side relay SMRG in the negative electrode-side power line NL. In other words, the precharge of the capacitor 32 of the PCU 3 may be performed by using this precharge circuit. Additionally, the PCU 3 may include one or a plurality of step-up/down converters.

The vehicle provided with the power supply system 1 described above is not limited to the electric vehicle EV. The vehicle which the present disclosure is applied to may be a two-motor (series parallel) hybrid vehicle having a power distribution mechanism, one-motor or two-motor hybrid vehicle, a series hybrid vehicle, a parallel hybrid vehicle or a plug-in hybrid vehicle.

As described above, a power supply system of the present disclosure includes a power storage device, a positive electrode-side relay, a negative electrode-side relay, and a power control unit that includes a capacitor configured to be pre-charged in response to a system start request and that is connected with the power storage device via the positive electrode-side relay and the negative electrode-side relay. The power supply system further includes a control device programmed to close the positive electrode-side relay and the negative electrode-side relay at different timings always or under a predetermined condition in response to the system start request. The control device is programmed to change a sequence of closing the positive electrode-side relay and the negative electrode-side relay in accordance with a predetermined restriction.

The power supply system according to the above aspect of the present disclosure closes the positive electrode-side relay and the negative electrode-side relay at different timings always or under the predetermined condition, in response to a system start request and changes the sequence of closing the positive electrode-side relay and the negative electrode-side relay in accordance with the predetermined restriction. This configuration suppresses stresses accompanied with closing from being unevenly accumulated in one of the positive electrode-side relay and the negative electrode-side relay. As a result, the power supply system according to this aspect of the present disclosure effectively extends the lives of the positive electrode-side relay and the negative electrode-side relay.

The control device may calculate a stress index of each of the positive electrode-side relay and the negative electrode-side relay, which indicates stresses accumulated into each of the positive electrode-side relay and the negative electrode-side relay accompanied with at least closing of the positive electrode-side relay or the negative electrode-side relay, and close one of the positive electrode-side relay and the negative electrode-side relay that has a larger stress index, prior to the other. This configuration enables at least stresses accompanied with closing to be more evenly accumulated into the positive electrode-side relay and the negative electrode-side relay. This configuration thus more effectively extends the lives of the positive electrode-side relay and the negative electrode-side relay.

Additionally, the control device may calculate the stress index of each of the positive electrode-side relay and the negative electrode-side relay by taking into account stresses accumulated into each of the positive electrode-side relay and the negative electrode-side relay accompanied with opening of the positive electrode-side relay or the negative electrode-side relay, and open one of the positive electrode-side relay and the negative electrode-side relay that has a smaller stress index, prior to the other, in response to a system stop request. This configuration also enables stresses accompanied with opening to be more evenly accumulated into the positive electrode-side relay and the negative electrode-side relay. This configuration thus more effectively extends the lives of the positive electrode-side relay and the negative electrode-side relay.

Also, when the positive electrode-side relay and the negative electrode-side relay are to be closed in an event of an abnormality in precharge of the capacitor, the control device may close one of the positive electrode-side relay and the negative electrode-side relay that has a larger stress index, prior to the other. This configuration causes the stress accompanied with closing in the case of an increased voltage difference between the power storage device and the capacitor, which is increased due to an abnormality in precharge of the capacitor to be larger than a voltage difference in the ordinary state, to be accumulated into the other of the positive electrode-side relay and the negative electrode-side relay that is closed later and that has the smaller stress index. As a result, this configuration effectively suppresses reduction of the lives of the positive electrode-side relay and the negative electrode-side relay caused by the abnormality in precharge of the capacitor. Additionally, this configuration causes the positive electrode-side relay and the negative electrode-side relay to be almost simultaneously closed in the case of no abnormality in precharge of the capacitor. This shortens the time period required for a system start.

Furthermore, after the positive electrode-side relay and the negative electrode-side relay are closed in the event of the abnormality in precharge of the capacitor, the control device may open one of the positive electrode-side relay and the negative electrode-side relay that has a smaller stress index, prior to the other, in response to a system stop request. This configuration more effectively suppresses reduction of the lives of the positive electrode-side relay and the negative electrode-side relay caused by the abnormality in precharge of the capacitor.

Also, when the positive electrode-side relay and the negative electrode-side relay are to be closed in an event of an abnormality in precharge of the capacitor, the control device may close one of the positive electrode-side relay and the negative electrode-side relay that was not closed prior to the other at a previous system start in an event of an abnormality in precharge, prior to the other. When the positive electrode-side relay and the negative electrode-side relay are to be closed in the event of an abnormality in precharge of the capacitor, one of the positive electrode-side relay and the negative electrode-side relay may be closed alternately prior to the other in response to every system start request. This configuration suppresses the stresses accompanied with closing in the case of an increased voltage difference between the power storage device and the capacitor, which is increased due to an abnormality in precharge of the capacitor to be larger than a voltage difference in the ordinary state, from being unevenly accumulated in one of the positive electrode-side relay and the negative electrode-side relay. As a result, this effectively suppresses reduction of the lives of the positive electrode-side relay and the negative electrode-side relay caused by the abnormality in precharge of the capacitor. Additionally, the power supply system of this aspect also causes the positive electrode-side relay and the negative electrode-side relay to be almost simultaneously closed in the case of no abnormality in precharge of the capacitor. This shortens the time period required for a system start.

Furthermore, in a case of no abnormality in precharge of the capacitor, the control device may close one of the positive electrode-side relay and the negative electrode-side relay, prior to the other, in response to the system start request, and when the positive electrode-side relay and the negative electrode-side relay are to be closed in an event of an abnormality in precharge of the capacitor, the control device may close the other of the positive electrode-side relay and the negative electrode-side relay, prior to the one. In the case of no abnormality in precharge of the capacitor, the power supply system of this aspect does not cause the stress accompanied with closing to be accumulated into the one of the positive electrode-side relay and the negative electrode-side relay but causes the stress accompanied with closing in the event of an abnormality in precharge of the capacitor to be accumulated into the one of the positive electrode-side relay and the negative electrode-side relay. As a result, this configuration causes the total stress accumulated in the positive electrode-side relay and the total stress accumulated in the negative electrode-side relay to become close to each other. Accordingly, this configuration more effectively extends the lives of the positive electrode-side relay and the negative electrode-side relay.

Also, in the case of no abnormality in precharge of the capacitor, the control device may open one of the positive electrode-side relay and the negative electrode-side relay, prior to the other, in response to a system stop request, and after the positive electrode-side relay and the negative electrode-side relay are closed in the event of the abnormality in precharge of the capacitor, the control device may open the other of the positive electrode-side relay and the negative electrode-side relay, prior to the one, in response to the system stop request. This configuration causes the total stress accumulated in the positive electrode-side relay and the total stress accumulated in the negative electrode-side relay to become closer to each other.

Furthermore, the control device may close one of the positive electrode-side relay and the negative electrode-side relay that was not closed prior to the other at a previous system start, prior to the other, in response to the system start request. The power supply system of this aspect closes one of the positive electrode-side relay and the negative electrode-side relay alternately prior to the other in response to every system start request. This configuration suppresses the stresses accompanied with closing from being unevenly accumulated in one of the positive electrode-side relay and the negative electrode-side relay. As a result, this configuration effectively extends the lives of the positive electrode-side relay and the negative electrode-side relay.

Also, the control device may open one of the positive electrode-side relay and the negative electrode-side relay that was closed prior to the other in response to a last system start request, prior to the other, in response to a system stop request. This configuration suppresses the stresses accompanied with opening from being unevenly accumulated in one of the positive electrode-side relay and the negative electrode-side relay. As a result, this configuration more effectively extends the lives of the positive electrode-side relay and the negative electrode-side relay.

Additionally, after one of the positive electrode-side relay and the negative electrode-side relay is closed prior to precharge of the capacitor in response to the system start request, the control device may determine welding or no welding of the other of the positive electrode-side relay and the negative electrode-side relay, based on a voltage of the capacitor, and after one of the positive electrode-side relay and the negative electrode-side relay is opened in response to the system stop request, the control device may cause the capacitor to be discharged and determine welding or no welding of one of the positive electrode-side relay and the negative electrode-side relay. The power supply system of this aspect causes the other of the positive electrode-side relay and the negative electrode-side relay that was not subjected to determination of welding or no welding at the time of a previous system stop, to be closed prior to the other at the time of a next system start. As a result, this configuration favorably suppresses one of the positive electrode-side relay and the negative electrode-side relay from being welded by the flow of inrush current that flows due to welding of the other at the time when only one of the positive electrode-side relay and the negative electrode-side relay is closed.

According to another aspect of the present disclosure, there is provided a control method of a power supply system including a power storage device, a positive electrode-side relay, a negative electrode-side relay, and a power control unit that includes a capacitor configured to be pre-charged in response to a system start request and that is connected with the power storage device via the positive electrode-side relay and the negative electrode-side relay. The control method of the power supply system comprises closing the positive electrode-side relay and the negative electrode-side relay at different timings always or under a predetermined condition, in response to the system start request, and changing a sequence of closing the positive electrode-side relay and the negative electrode-side relay in accordance with a predetermined restriction.

The control method of the power supply system according to the above aspect of the present disclosure suppresses stresses accompanied with closing from being unevenly accumulated in one of the positive electrode-side relay and the negative electrode-side relay. This configuration thus effectively extends the lives of the positive electrode-side relay and the negative electrode-side relay.

The aspects of the present disclosure are not limited at all to the embodiments described above but may be modified, changed and altered in various ways within the extended scope of the present disclosure. The embodiments of the present disclosure are provided to illustrate the concrete examples of the aspects of the present disclosure described in Summary and are not intended to limit the features of the present disclosure described in Summary.

INDUSTRIAL APPLICABILITY

The disclosure is applicable to, for example, the manufacturing industries of power supply systems.

What is claimed is:
1. A power supply system including a power storage device; a positive electrode-side relay; a negative electrode-side relay; and a power control unit that includes a capacitor configured to be pre-charged in response to a system start request and that is connected with the power storage device via the positive electrode-side relay and the negative electrode-side relay, the power supply system comprising:
- a control device programmed to close the positive electrode-side relay and the negative electrode-side relay at different timings always or under a predetermined condition in response to the system start request, the control device programmed to change a sequence of closing the positive electrode-side relay and the negative electrode-side relay in accordance with a predetermined restriction,
- wherein the control device calculates a stress index of each of the positive electrode-side relay and the negative electrode-side relay, which indicates stresses accumulated into each of the positive electrode-side relay and the negative electrode-side relay accompanied with at least closing of the positive electrode-side relay or the negative electrode-side relay, and closes one of the positive electrode-side relay and the negative electrode-side relay that has a larger stress index, prior to the other.

2. The power supply system according to claim 1,
wherein the control device calculates the stress index of each of the positive electrode-side relay and the negative electrode-side relay by taking into account stresses accumulated into each of the positive electrode-side relay and the negative electrode-side relay accompanied with opening of the positive electrode-side relay or the negative electrode-side relay, and opens one of the positive electrode-side relay and the negative electrode-side relay that has a smaller stress index, prior to the other, in response to a system stop request.

3. The power supply system according to claim 1,
wherein when the positive electrode-side relay and the negative electrode-side relay are to be closed in an event of an abnormality in precharge of the capacitor, the control device closes one of the positive electrode-side relay and the negative electrode-side relay that has a larger stress index, prior to the other.

4. The power supply system according to claim 3,
wherein after the positive electrode-side relay and the negative electrode-side relay are closed in the event of the abnormality in precharge of the capacitor, the control device opens one of the positive electrode-side relay and the negative electrode-side relay that has a smaller stress index, prior to the other, in response to a system stop request.

5. A power supply system including a power storage device; a positive electrode-side relay; a negative electrode-side relay; and a power control unit that includes a capacitor configured to be pre-charged in response to a system start request and that is connected with the power storage device via the positive electrode-side relay and the negative electrode-side relay, the power supply system comprising:
- a control device programmed to close the positive electrode-side relay and the negative electrode-side relay at different timings always or under a predetermined condition in response to the system start request, the control device programmed to change a sequence of closing the positive electrode-side relay and the negative electrode-side relay in accordance with a predetermined restriction,
- wherein when the positive electrode-side relay and the negative electrode-side relay are to be closed in an event of an abnormality in precharge of the capacitor, the control device closes one of the positive electrode-side relay and the negative electrode-side relay that was not closed prior to the other at a previous system start in an event of an abnormality in precharge, prior to the other.

6. A power supply system including a power storage device; a positive electrode-side relay; a negative electrode-side relay; and a power control unit that includes a capacitor configured to be pre-charged in response to a system start request and that is connected with the power storage device via the positive electrode-side relay and the negative electrode-side relay, the power supply system comprising:
- a control device programmed to close the positive electrode-side relay and the negative electrode-side relay at different timings always or under a predetermined condition in response to the system start request, the control device programmed to change a sequence of closing the positive electrode-side relay and the negative electrode-side relay in accordance with a predetermined restriction,
- wherein in a case of no abnormality in precharge of the capacitor, the control device closes one of the positive electrode-side relay and the negative electrode-side relay, prior to the other, in response to the system start request, and
- when the positive electrode-side relay and the negative electrode-side relay are to be closed in an event of an abnormality in precharge of the capacitor, the control device closes the other of the positive electrode-side relay and the negative electrode-side relay, prior to the one.

7. The power supply system according to claim 6,
wherein in the case of no abnormality in precharge of the capacitor, the control device opens one of the positive electrode-side relay and the negative electrode-side relay, prior to the other, in response to a system stop request, and
after the positive electrode-side relay and the negative electrode-side relay are closed in the event of the abnormality in precharge of the capacitor, the control device opens the other of the positive electrode-side relay and the negative electrode-side relay, prior to the one, in response to the system stop request.

8. A power supply system including a power storage device; a positive electrode-side relay; a negative electrode-side relay; and a power control unit that includes a capacitor configured to be pre-charged in response to a system start request and that is connected with the power storage device via the positive electrode-side relay and the negative electrode-side relay, the power supply system comprising:
- a control device programmed to close the positive electrode-side relay and the negative electrode-side relay at different timings always or under a predetermined condition in response to the system start request, the control device programmed to change a sequence of closing the positive electrode-side relay and the negative electrode-side relay in accordance with a predetermined restriction,
- wherein the control device closes one of the positive electrode-side relay and the negative electrode-side relay that was not closed prior to the other at a previous system start, prior to the other, in response to the system start request.

9. The power supply system according to claim 8,
wherein the control device opens one of the positive electrode-side relay and the negative electrode-side relay that was closed prior to the other in response to a last system start request, prior to the other, in response to a system stop request.

10. The power supply system according to claim 9,
wherein after one of the positive electrode-side relay and the negative electrode-side relay is closed prior to precharge of the capacitor in response to the system start request, the control device determines welding or no welding of the other of the positive electrode-side relay and the negative electrode-side relay, based on a voltage of the capacitor, and after one of the positive electrode-side relay and the negative electrode-side relay is opened in response to the system stop request, the control device causes the capacitor to be discharged and determines welding or no welding of one of the positive electrode-side relay and the negative electrode-side relay.

\* \* \* \* \*